United States Patent [19]
Mizobe et al.

[11] Patent Number: 6,130,947
[45] Date of Patent: Oct. 10, 2000

[54] METHOD OF CONFIGURING ACCESS AND SECURITY CODE

[76] Inventors: Tatsuji Mizobe, 21-3, Sugano 1-chome, Ichikawa-shi, Chiba 272, Japan; Takashi Sawaguchi, 40-13, Takadanobaba 3-chome, Shinjuku-ku, Tokyo 169, Japan

[21] Appl. No.: 09/002,003

[22] Filed: Dec. 31, 1997

[51] Int. Cl.$^7$ ..................................................... H04L 9/00
[52] U.S. Cl. ................... 380/54; 283/73; 283/17
[58] Field of Search .................. 283/17, 73, 74, 283/94; 713/165, 166, 200, 201, 183, 184; 707/6; 380/51, 54

[56] References Cited

U.S. PATENT DOCUMENTS

| | | | |
|---|---|---|---|
| 5,466,012 | 11/1995 | Puckett et al. | 283/67 |
| 5,790,703 | 11/1995 | Wang | 382/212 |
| 5,949,885 | 11/1995 | Leighton | 380/54 |
| 6,000,728 | 12/1999 | Mowry et al. | 283/393 |

*Primary Examiner*—Gail O. Hayes
*Assistant Examiner*—Ho S. Song
*Attorney, Agent, or Firm*—Liniak, Berenato, Longacre & White

[57] ABSTRACT

The configuration procedure for an access code and for a security code is provided, comprising: providing references retaining element file that records the base checkerboard-like substrate, checkerboard-like substrates and the color substrates as a graphical image with a hierarchical layered structure arranged on the base substrate, assigning the digital elements to both the x- and the y-axes of the base substrate, assigning the digital elements assigned to the references retaining element on the base substrate perpendicular to the selected two retaining element to the selected two retaining element of the checkerboard-like substrate, configuring code based on the assigned digital elements and the prescribed priority order of the first and areal codes and at the time of the code configuration, recording the location of the retaining element, coaxially rotating the checkerboard-like substrates and color substrates with respect to base checkerboard-like substrate, whereby a new code is configured based on the assigned digital element of the retaining element and the prescribed priority order of the first and second areal codes, and in data accessing, performing code inputting after returning each position of the retaining elements to their initial locations based on the record of each of the retaining elements' relationship of the positions.

38 Claims, 15 Drawing Sheets

METHOD OF CONFIGURING ACCESS AND SECURITY CODE

BACKGROUND OF THE INVENTION

1. Field of the Invention

The present invention relates to a technique of a configuring method for access codes in order to access the prescribed data and a configuring method for security codes in order to protect the prescribed data.

2. Prior Art

Today, many kinds of data is digitalized and, at the same time, the time has arrived when a large number of computers are connected together by various telecommunication and communication networks, such as LAN (Local Area Network), WAN (Wide Area Network), through the Internet and so forth. Moreover, Online Shopping, Video On Demand (VOD), Electronic Commerce, and so forth, are entering the age of becoming a reality and of becoming of practical use. In this new age, a significant and important problem is how the data security and the integrity of computer systems can be ensured. However, existing techniques are not yet entirely satisfactory. A plenitude of examples of illegal break-ins to computers by hackers, and so on, have been reported and documented. For example, in November 1994, a hacker broke into British Telecom (BT), a telecommunication company in England. In addition to highly confidential information such as national defense related and public security related information, the private, unpublished telephone numbers of the Prime Minister's Official Residence and the Buckingham Palace were stolen. In Japan, there was an incident involving Niftyserve, a major personal computer communication company, where a large number of passwords were used illegally.

Until now, the common and accepted approach to data protection involves the data being encrypted. However, the current encryption technique is both time intensive and labor intensive. Additionally, there is a problem associated with the administration of the "key" which is used to decrypt the encrypted data. Moreover, the encrypted data must be decrypted by the use of the "key". Because of the inconvenience of dealing with and handling the data, data encryption is not considered to be a breakthrough in data security technology. Furthermore, data encryption leaves open the possibility of the security measures being decoded and the data compromised unless highly sophisticated encryption methods are used.

SUMMARY OF THE INVENTION

The present invention is proposed in order to solve the problems described above, and the object of the present invention is to provide the configuration method for an access code or for a security code, which completely prevents illegal access to the prescribed data.

The present invention to attain the object described above relates to a configuration method for an access code in order to provide access to the prescribed data or for a security code that protects the prescribed data, comprising: assigning a digit al element of the code to both the first compartment area and the second compartment area, which are divided by a diagonal line, and at the same time, maintaining a references retaining element file which records the compartment two references retaining element represented by a first areal code and a second areal code for each of the first compartment area and the second compartment area, as a graphical image; establishing the order of the priority of the first areal code and second areal code for the compartment two references retaining element that is recorded in the references retaining element file, and then configuring the code using the priority of the digital elements, performed according to the priority of the first compartment area and the second compartment area, which are both assigned the first areal code or the second areal code that has the digital elements; shuffling the first areal code and the second areal code are shuffled at prescribed hours, or, alternateively, at random after the configuration of the code, according to this shuffling, configuring a new code based on the priority order, and at the same time, recording this shuffling to the references retaining element file; and reading the data from the references retaining element file and displaying it on the visual display unit when the data needs to be accessed, performing the data accessing by entering the code that was generated according to the priority, based on the location of the first areal code and the second areal code of the displayed compartment two references retaining element.

Moreover, a feature of the present invention resides in: providing a references retaining element file that records, as a graphical image, the reference retaining element, which includes at least one compartment two references retaining element, and which is arranged into a hierarchy according to a prescribed number of the one reference retaining element or compartment two references retaining element, except for the compartment two references retaining element which is a base; assigning the first compartment area and the second compartment area of the other compartment two reference retaining element, which completely overlaps in the vertical direction the compartment two reference retaining element that is the base, to the each of the reference retaining elements which are recorded in the reference retaining element file, the digital element, which is assigned to the first compartment area and the second compartment area of the compartment two reference retaining element that is the base; entering and configuring the code, based on the prescribed priority order, between the first areal code and the second areal code of the compartment two references retaining element, and on the entered digital element, which is allotted to each reference retaining element under the previously prescribed order of each reference retaining element, and at the same time, recording the location of each reference retaining element at the moment of the code configuration; horizontally or coaxially rotating the other compartment two references retaining element, except for the compartment two references retaining element which is the base, are rotated horizontally at the prescribed times or, alternatively, at random after the configuration of the code, for the case when the positions of the first compartment area and the second compartment area of the other compartment two references retaining element are switched by the rotation, assigning the newly assigned digital codes to the switched first compartment area and the second compartment area, to allot these assigned digital codes to the first compartment area and the second compartment area of the compartment two references retaining element that is the base, which overlaps the switched first compartment area and the second compartment area; configuring a new code by utilizing the newly assigned digital element and by the shuffling of the first areal code and second areal code; and entering the data after returning to the position of the initial code configuration for each references retaining element, based on the records of each of the references retaining element's positional relationship.

Further, another feature of the present invention resides in: providing a base checkerboard-like substance in which an equal number of compartment two references retaining elements are arranged along the X-axis directions and Y-axis directions on the same plane so that the diagonal lines go toward the same direction and a references retaining element file, composed of two references retaining elements arranged in the same way as the arrangement of the base checkerboard-like substances, which records a base checkerboard-like substrate and one or more checkerboard-like substrates as a layered hierarchical graphical image on top of the base checkerboard-like substrate; assigning the digital element to each of the compartment two references retaining elements along the x-axis direction and y-axis direction in both areas separated by the diagonal line of the base checkerboard-like substrate, which are recorded in the references retaining element file, so that the assigned digital element is the common digital element of the first compartment area and the second compartment area of each of the compartment two references retaining elements in both the x-axis direction and the y-axis direction; at the same time, choosing one or more of the two references retaining elements from each of the checkerboard-like substrates, and assigning the digital element assigned to the compartment two references retaining element of the base checkerboard-like substrate located in a vertically overlapped position from the chosen two references retaining elements to the chosen two references retaining elements of the checkerboard-like substrate; configuring the code based on the assigned digital element and the priority order of first areal code and second areal code, and at the same time, recording the relationship between the locations of each reference retaining element at the time of the code configuration including the relationship between the locations of the first areal code and the second areal code; coaxially and horizontally rotating the checkerboard-like substrate to the base checkerboard-like substrate; when the chosen two references retaining elements overlap completely in the vertical direction onto the new compartment two references retaining element of the base checkerboard-like substrate, that is, when they are aligned, assigning the digital element which is allotted to the compartment two references retaining element to the two references retaining element by this rotation and at the same time, configuring a new code based on this assigned digital element and the previously prescribed priority order of the first areal code and second areal code; and in the event of data accessing, performing the code input after returning each of the references retaining elements to their initial positions based on the record of each of the references retaining element's relationship of the positions.

PREFERRED EMBODIMENTS OF THE INVENTION

Figure 1:
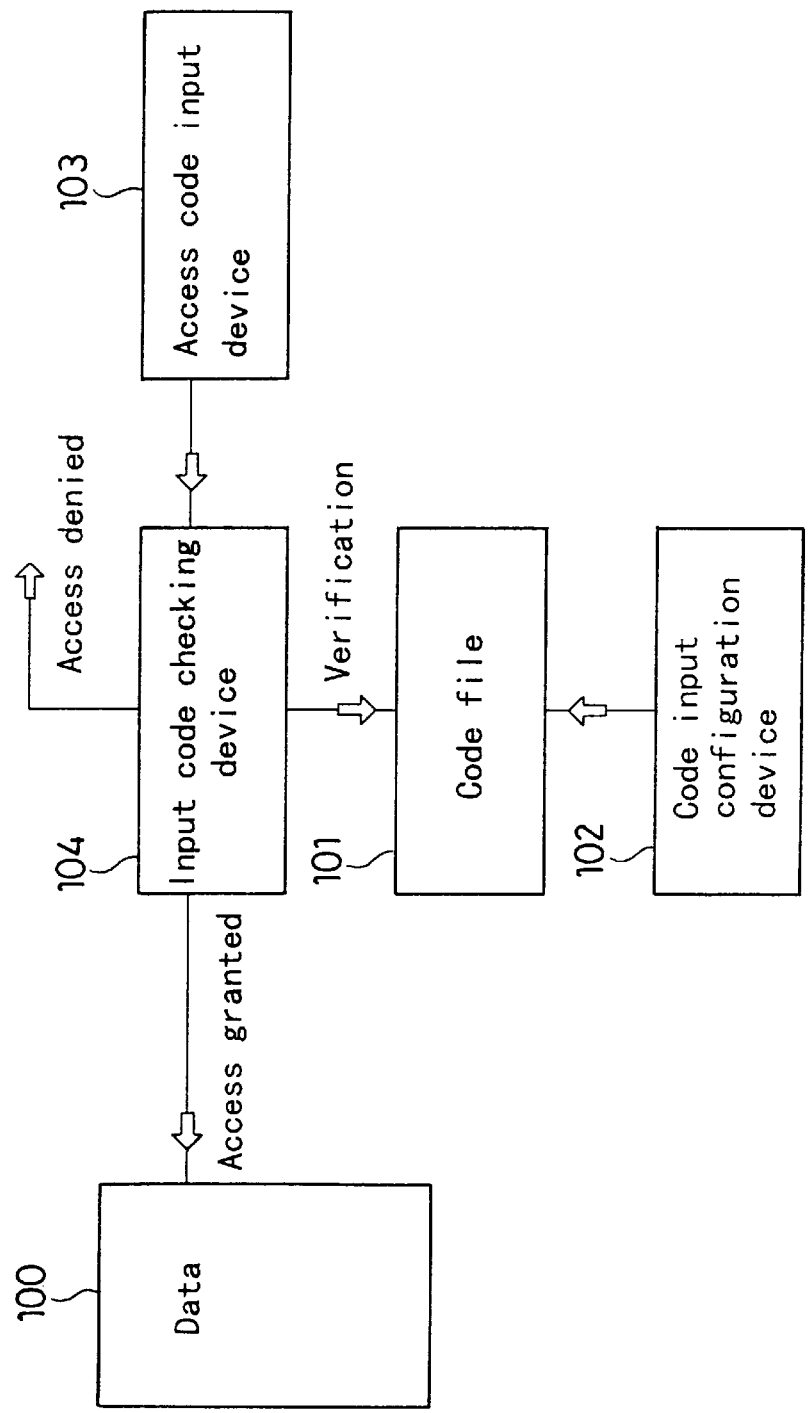
FIG. 1 is a block figure which outlines the procedure involved when accessing data for a general computer system.

FIG. 1 outlines a procedure used for the case of accessing a data (100), in a general computer system. Firstly, a code file (101) contains the access code or the security code, which is also entered and configured from a code input configuration device (102). When an access code is entered from a code input device (103), an input code checking device (104) verifies the entered code with the recorded code in the code file (101). As a result of this verification, if they agree, access to the data (100) is granted; if the two codes do not agree, access to the data (100) is denied. The present invention is concerned with the input and the configuration of the access code as well as the input and configuration of the security code recorded in the code file (101).

Generally, illegal intrusion to the data (100) as shown in the figure can be generalized as follows. One method is the so-called "Attack by Force" method which generates the codes by utilizing a code generating program, and the procedure is to enter these codes to the access code input device (103) by using a computer. Another method consists of accessing the code file (101) directly. Usually, the code recorded in the code file (101) is encrypted, and, although the code file (101) itself is guarded securely, there exists the possibility that it can be compromised. Yet another example consists of an attack to the code input configuration device (102). The present invention is concerned with making it possible to effectively cope with the illegal access or illegal intrusion methods. Following, is an explanation of the methods involved.

Figure 2:
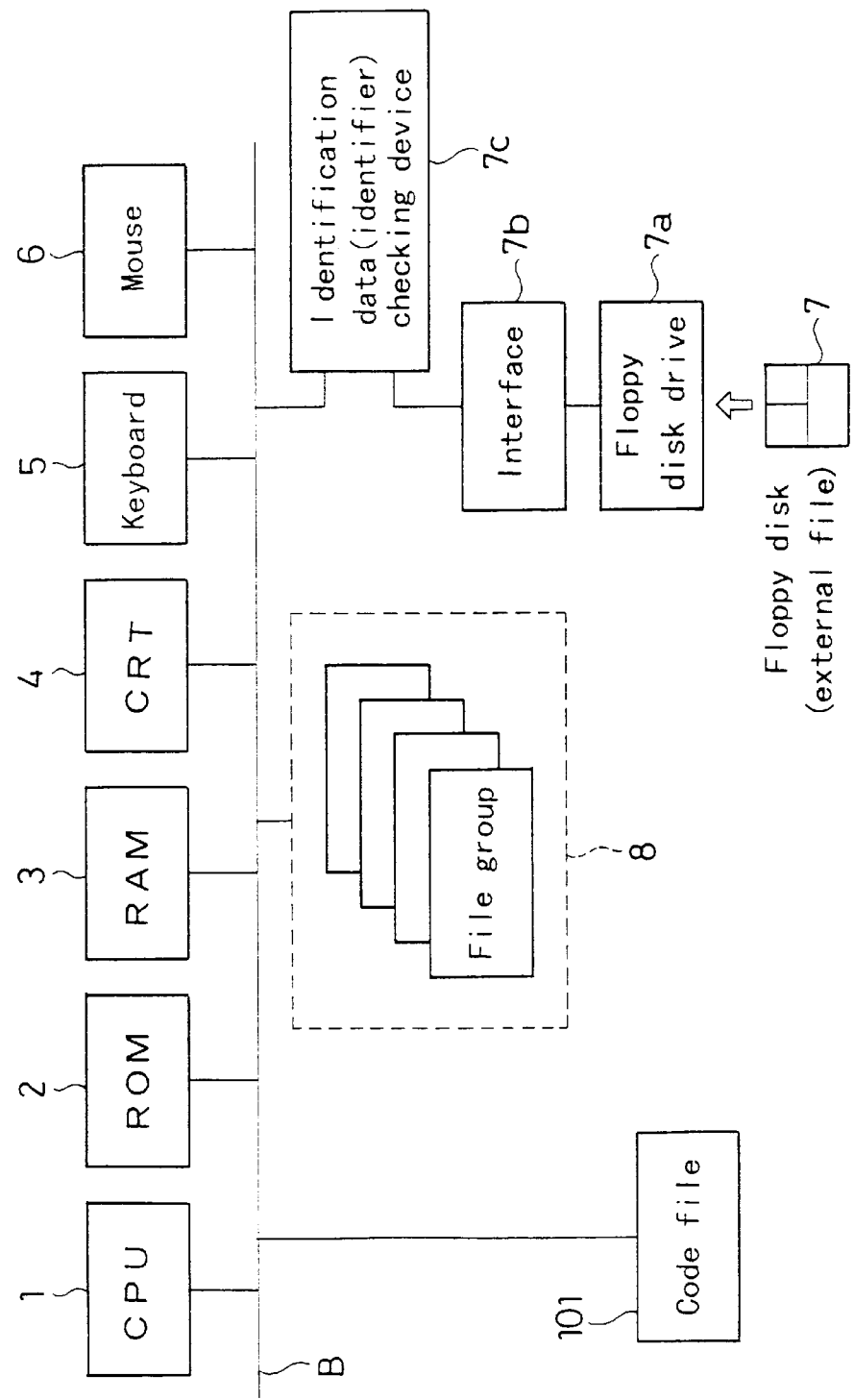
FIG. 2 is a diagram showing the structure of the control system in Examples 1 to 4.

FIG. 2 shows a diagram of the structure for the control system in the present invention. In the Figure, CPU (1), connected to Bus (B), controls each operation based on the system program recorded in ROM (2). RAM (3) is the working memory. CRT (4), the visual display unit, and the keyboard (5) and the mouse (6) used as data input devices, are also connected to Bus (B). The floppy disk drive (7a) and the interface (7b) used to read the data of the floppy disk (7), which contains the external file, and the identification data checking device (7c) used to verify the identification data, also referred to as the identifier, which is recorded in the floppy disk (7), are connected to the Bus (B) as well. (8) is a file group consisting of reference retaining element files and so on, and (101) is the code file, shown in FIG. 1, which is used to record the configured code. This code file (101) may be connected directly to the Bus (B), or it may be connected to the code file of the external computer system through the interface, which is not shown in the Figure. The following is the explanation of each Example. Further, FIG. 1 is a diagram of the common control system structure used in Examples 1 to 4.

EXAMPLES

Example 1

Figure 3:
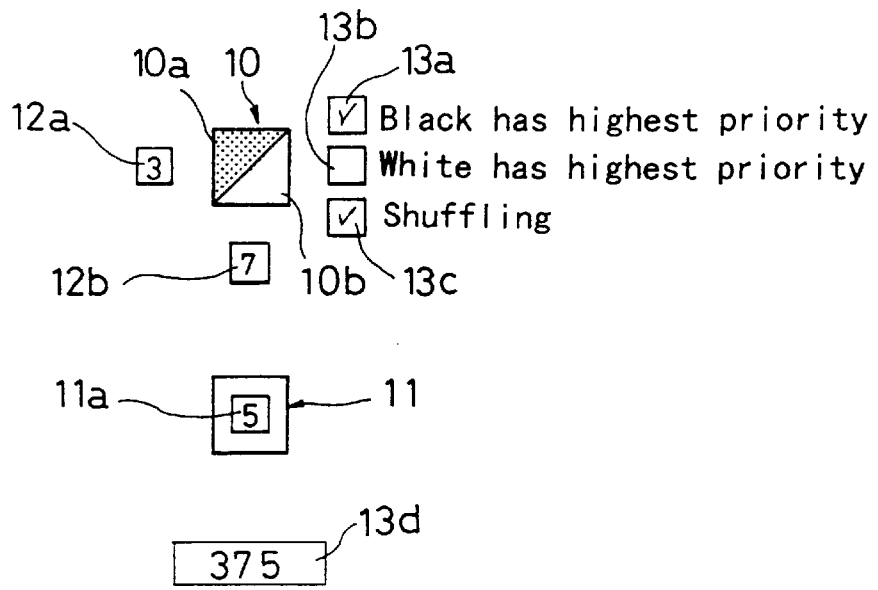
FIG. 3. shows a code input screen in Example 1.
Figure 4:
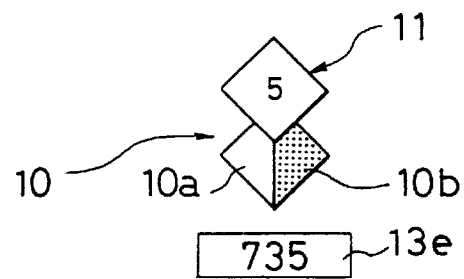
FIG. 4. shows a code input screen for the case of data accessing in Example 1.
Figure 5:
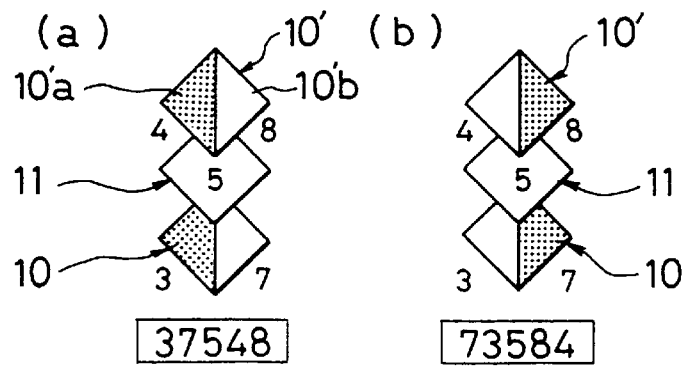
FIG. 5(*a*) and (*b*) show examples of the two references retaining elements added to the examples shown in FIG. 3 and FIG. 4.

Example 1 will be explained by referring to FIGS. 3 to 5. In this Example 1, the code is configured by the one reference retaining element, which is assigned one digital code as the digital element, and the compartment two references retaining element (hereinafter simply referred to as "the two references retaining element") which is assigned two digital codes as the digital element. The code—input screen, shown in FIG. 3, is read from the prescribed reference retaining element file of the file group 8, which records the two reference retaining element (10) and the one reference retaining element (11) as graphical images and which is displayed on the CRT (4). The two references retaining element (10) is divided into two areas, referred to as the first compartment area (10a) and the second compartment area (10b), by a diagonal line. The first compartment area (10a) is assigned the colour black for the first areal code and the second compartment area (10b) is assigned the colour white as the second areal code. These areal codes can be anything as long as they can be distinguished. For instance, alphabetical letters such as A and B, or a cat and a dog, can be used instead of the colours black and white.

Also, in the first compartment area (10a) and the second compartment area (10b), the input windows (12a) and (12b), used to allot the digital code, are displayed. The digital codes, which are allotted to the first compartment area (10a) and the second compartment area (10b), are entered into these input windows from the keyboard (5). These digital codes can be alphabetical letters or Kanji letters (Chinese characters) as well as numbers. In the example shown in the diagram, number [3] is allotted to the first compartment area (10a) and the number [7] is allotted to the second compartment area (10b). Further, the icons (13a), (13b) and (13c) are displayed. Icon (13a) is used to give the black areal code the highest priority. Icon (13b) is used, similarly, to give the white areal code the highest priority. Icon (13c) is used to determine whether shuffling is to be performed or not. If icon (13a), which assigns the highest priority to the black areal code, is chosen, by selecting it with the mouse (6), the code selection is performed, which is described by the digital code having the higher priority. This digital code is assigned to either the first compartment area (10a) or the second compartment area 10b in which the black areal code is located. In the example shown in the diagram, code [37] is selected, since the black areal code exists in the first compartment area (10a), which is allotted to the digital code [3]. On the contrary, if the icon (13b), which assigns the highest priority to the white areal code, is chosen, by clicking the mouse (6) to select it, the code configuration [73] is performed.

Icon (13c) is used to determine whether switching between the first areal code and the second areal code is performed or not (this switching between the first areal code and second areal code is called "shuffling", or is called "to shuffle"). As a consequence of this switching, an considering the case in which the configuration is that where the black areal code has highest priority, as in the example shown in the diagram, the code configuration becomes [37], as mentioned above. However, by shuffling, if the black areal code and the white areal code are switched, the code is changed to [73], since the black areal code had highest priority. In this Example 5, if the shuffling is selected, the black and the white areal codes are switched at random time intervals. The shuffling time intervals can be chosen at will. For example, the shuffling time intervals can be chosen to be ten second intervals, one minute intervals, ten minute intervals and so forth. The switching of the first areal code and the second areal code by this shuffling mechanism, is continuously recorded in the prescribed references retaining element file in the file group 8.

The digital code, entered from the keyboard (5), is assigned to the one reference retaining element (11) as well, as shown in FIG. 3. In the example shown in the diagram, the input window (11a) is assigned the digital code [5]. This assigned digital code is also, as mentioned above, not necessarily a number. It can be a colour, a pattern, a member of the alphabet, a Chinese character and so forth. Using the above input, the code is configured. The digital code, which is assigned to the two references retaining element (10), is described first. At the same time, if the mentioned black areal code is given the highest priority, the code configuration becomes [375]. The digital code, assigned to the one reference retaining element (11) or the two references retaining element (10), which is described first, can be chosen at will. Then, the configured code is displayed in the code display window (13d). The fixed password is added to this configured code and the result becomes the final code, and is connected to the code file (101).

In order to access the data, whose code is configured in the fashion described above, the code—input screen, shown in FIG. 4, is read to the CRT (4) from the prescribed references retaining element file in the file group (8). The code, which first describes the digital code that is assigned to the first compartment area (10a) or the second compartment area (10b) comprising the two references retaining element (10), in which the highest priority black areal code is located, is entered into the input window (13e) of this screen. In the example shown in the diagram, since the black areal code is located in the second compartment area (10b), the code input is [735]. This is different from the initial configured code [375]. In this manner, the order of inputting the digital codes which consists of the code, is not known until the code—input screen is read in the CRT (4).

In Example 1, the code is configured using the 3 digit digital code of the two references retaining element (10) and the one reference retaining element (11). Moreover, by adding the two references retaining element (10) and the one reference retaining element (11), a code consisting of many digits can be easily configured. As showings Figures (a) and (b), by adding the two references retaining element (10'), by assigning the digital code [4] to the first compartment area (10'a) of this two references retaining element 10', by assigning the digital code [8] to the second compartment area 10'b of the two references retaining element 10', by giving the black areal code the highest priority, and by describing the digital code in the order from the lowest two references retaining element (10) to the uppermost, the code becomes [37548], for the example described by Figure (a). However, as shown in the example described by FIG. 5(b), if the black areal code moves to the other side, the code becomes [73584], which is quite a different code. In this way, the configured code is periodically changed and security is improved.

Example 2

Figure 6:
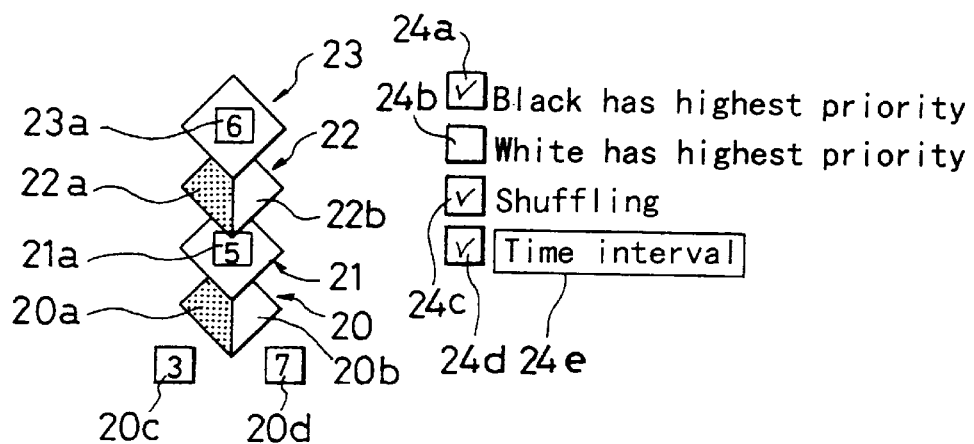
FIG. 6 shows a code input screen in Example 2.
Figure 7:
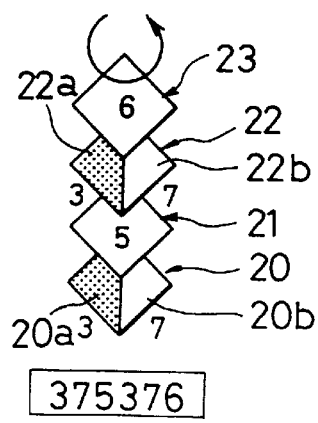
FIG. 7. is a diagram which explains the authorized code for the configuration shown in FIG. 6.

Now, Example 2 of the present invention will be explained by referring to FIGS. 6 to 9. In Example 2, as shown in FIG. 6, one two references retaining element becomes the base. To this two references retaining element base, several other two references retaining elements and one references retaining elements are arranged into a layered hierarchy with the constraint that at least one two references retaining element is included. Then, as shown in FIG. 7, the one reference retaining elements or two references retaining elements can be rotated, coaxially by 90 degrees in the horizontal plane with respect to the two references retaining element which became the base.

Next, the configuration of the code is explained. FIG. 6 is a code—input screen, which is read from the prescribed references retaining element file of the file group 8, and is displayed on CRT (4). On this screen, the assigned digital code is entered into the input window (20c) of the first compartment area (20a) in the two references retaining element (20). The assigned digital code is also entered into the input window (20d) of the second compartment area (20b), in the two references retaining element (20). In this case, when the digital code is assigned to the first compartment area (20a) and to the second compartment area (20b), in the two references retaining element (20) which becomes the base, the allotted digital code is also assigned to the first compartment area (22a) and the second compartment area (22b) in the other two references retaining element (22) that is completely overlapped in the vertical direction with respect to the two references retaining element (20) that became the base. In the example shown in the diagram, the digital code [3] that was assigned to the first compartment area (20a) of the two references retaining element (20) which became the base, is also assigned to the first compartment area (22a) in the other two references retaining element (22). At the same time, the digital code [7] that was assigned to the second compartment area (20b) in the two references retaining element (20) which became the base, is also assigned to the second compartment area (22b) in the other two references retaining element (22).

Moreover, the digital code configured from the keyboard 5 is entered into the input windows (21a) and (23a) of the one reference retaining elements (21) and (23). Further, similarly to the Example 1 discussed above by clicking the mouse (6) on the icons (24a) and (24b) which are used to choose whether black has the highest priority or white has the highest priority, and the icon (24c) which is used to choose whether the shuffling is performed or not, the appropriate features are selected. In this Example, black which has the highest priority is selected. Furthermore, the rotation mode can be chosen or not by selecting or not selecting the icon (24d). In the case when the rotation mode is selected, the rotation time intervals are entered into the input window 24e. When this rotation mode is selected, the other one reference retaining elements (21) and (23) and the two references retaining elements (22), with the exception of the two references retaining element (20) which became the base, are rotated coaxially in the horizontal plane which is parallel to the two references retaining element (20) that is the base. In this case, choosing whether the rotation is selected or not can be done at will for each one reference retaining element and two references retaining element. However, a s discussed later, at least one of the two references retaining elements, for example (22), must be rotated.

The relationship between the location of each of the one reference retaining elements (21) and (23), and the relationship between the two references retaining elements (20) and (22), at the starting time of the rotation, are recorded onto the floppy disk (7) in the external file, through the aforementioned interface (7b) and the floppy disk drive (7a) In this case, the configured code can be recorded onto the floppy disk (7), as well. Concerning the recording of the above data onto the floppy disk (7), verification that the proper identifier is recorded onto the floppy disk (7) is first performed utilizing the identification data checking device (7c) (see FIG. 2). This verification of the data that is written onto the floppy disk (7), which will contain the external file, is performed in each of the following Examples.

The order in which the digital code, configured by the procedure is described is as follows. The digital code is first described by the digital code which was assigned to the first compartment areas (20a) and (22a), that has the black areal code, and, thus, that has the highest priority, as mentioned above. At the same time, the digital code is first described by the digital code which was assigned to the reference retaining element that is at the lowest position. As a result, the code [375376] is configured, as shown in FIG. 7. In this configuration, when the one reference retaining elements (21) and (23), and the two references retaining element (22), rotate 180 degrees, in two separate 90 degree rotations, and are positioned as in FIG. 8, the position of the first compartment area (22a) and the second compartment area (22b) in the two references retaining element (22), are switched. The first compartment area (22a) is thus newly assigned the digital code [7] assigned to the second compartment area (20b) in the two references retaining element (20) that is the base and which is positioned such that it completely overlaps the first compartment area (22a) in the vertical direction, as explained before. Moreover, the second compartment area in the two references retaining element (22) is newly assigned the digital code [3] assigned to the first compartment area (20a) in the two references retaining element (20) that is the base which again is positioned such that it completely overlaps the first compartment area (22b) in the vertical direction.

Figure 8:
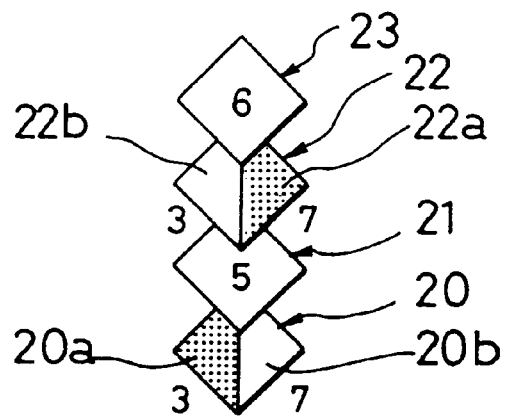
FIG. 8 is a diagram which explains the process by which the code is changed from the state shown in FIG. 7, utilizing the rotational mode.
Figure 9:
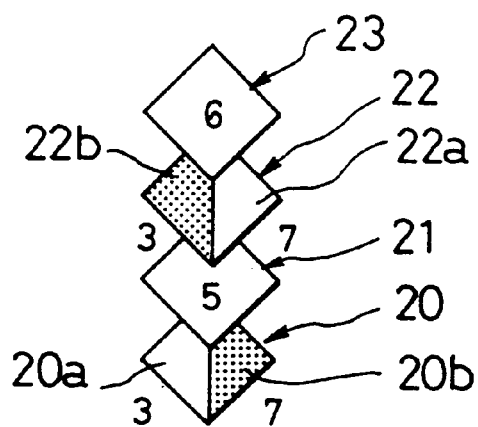
FIG. 9 is a diagram which explains the process by which the code is modified from the case of FIG. 8 utilizing the shuffling procedure.

As a result, the situation is that of FIG. 8, where the code [375736] is newly configured. In addition to this kind of rotational mode, as mentioned before, is the switching of the black and white areas, or switching of the first areal code and second areal code. In other words, according to the priorities of the digital code description based on the shuffling, the code is changed. For example, when the black areal code in each of the two references retaining elements (20) and (22) is in the configuration shown in FIG. 9, the code configuration becomes [735376], since the black is given the highest priority. This newly configured code is recorded each time in the code file (101).

Moreover, by selecting the rotational mode, the configured code which is recorded in the code file (101) in the rotational positions of 90 degrees and 270 degrees from the starting position, shown in FIG. 7, is deleted temporarily. This results in a condition where no code is configured. Also, in the rotational positions of 90 degrees and 270 degrees, the configuration can be made so that the verification from the input code checking device (104) cannot be accepted. In this way, by the means of hiding the configured code temporarily security is improved.

Consider, now, the case of data accessing. Firstly, the data in the floppy disk (7) is read through the floppy disk drive (7a) and the interface (7b). However, for the case of this data reading, the identifier which is recorded on the floppy disk (7) is checked with the identification data checking device (7c), and the legitimacy of the external file on the floppy disk (7) is determined. Through this verification, based on the data read from the floppy disk (7), each of the reference retaining elements (20), (21), (22), and (23) are returned to their initial configurations at the starting time—the positions are shown in FIG. 6. The black and the white sections of the first areal code and the second areal code are also returned to their initial configuration at the starting time. In this condition, the initially configured code is entered into the prescribed code input window, and the data access is performed. Moreover, in each of the following Examples as well, the verification of the identifier is always performed in the event of data reading.

Example 3

Figure 10:
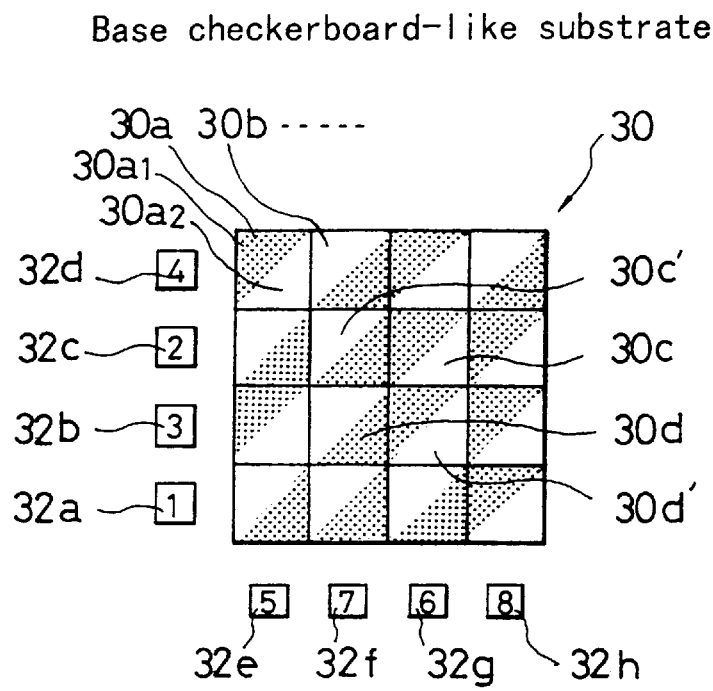
FIG. 10 is a diagram which explains the digital element assignment screen for the base checkerboard-like substrate and the checkerboard-like substrate in Example 3.
Figure 11:
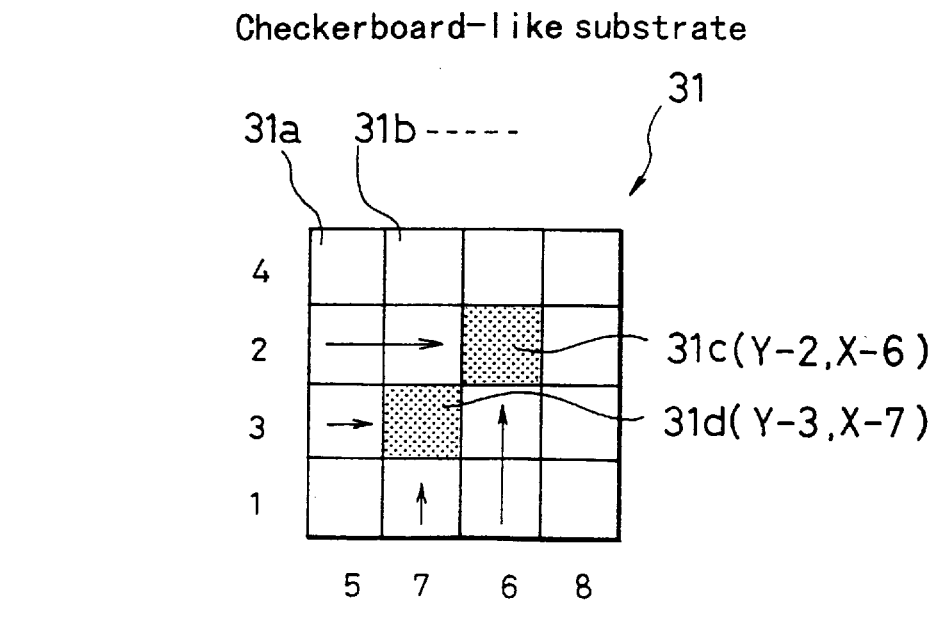
FIG. 11 shows a code configuration screen of the checkerboard-like substrate.

Example 3 of the present invention will be explained by referring to FIGS. 10 to 13. In this Example 3, as shown in FIG. 10, the same number of two references retaining elements (30a), (30b), and so on, are arranged along both the x-axis direction and the y-axis direction, in the same plane, onto a base checkerboard-like substrate (30). Similarly to the two references retaining element (10), shown in FIG. 3, the two references retaining element is divided by the diagonal line into the first compartment area (for example $30a_1$) and the second compartment area (for example $30a_2$). Each of these compartment areas are then assigned a first areal code and a second areal code, consisting of the black and white colors. As shown in FIG. 11, the checkerboard-like substrate (31) is divided into 16 squares comprising the checkerboard along the y-axis direction and the x-axis direction similarly to the base checkerboard-like substrate (30). Further, other checkerboard-like substrates on this base checkerboard-like substrate (30) are arranged into a layered hierarchy comprising one or more checkerboard substrates and the code configuration is performed. At the same time, the checkerboard-like substrate (31) which is layered into the aforementioned hierarchy, is rotated coaxially along the horizontal plane. In this Example, the case in which one checkerboard-like substrate (31) is added on a different level within the layered hierarchy to the base checkerboard-like substrate (30) will be considered.

FIG. 10 and FIG. 11 are the digital code assignment screens of the base checkerboard-like substrate (30) and checkerboard-like substrate (31), read from the prescribed references retaining element file of the file group 8. The base checkerboard-like substrate (30) is divided by each square—shaped section of the two references retaining elements (30a), (30b) and so on, in the direction of x-axis and in the direction of y-axis. In this case, the diagonal lines, which divide the two references retaining elements (30a), (30b) and so on, into the first compartment area (for example, $30a_1$) and the second compartment area (for example, $30a_2$), are arranged in such a way that they are aligned in the same direction in each of the two references retaining elements (30a), (30b) and so forth.

Next, the digital code is assigned. The assigned digital code is entered into the input windows, (32a) to (32h), from the keyboard (5). The digital codes that are assigned are not necessarily numbers. Similarly to the other examples discussed above alphabets etc. are accepted as well. In the example shown in the diagram, the digital code [1324] is assigned to the y-axis direction, and [5768] is assigned to the x-axis direction. After this entry by the use of the checkerboard-like substrate (31) shown in FIG. 11, the code configuration is performed. That is, from each of the two references retaining elements (31a), (31b) and so on, in the checkerboard-like substrate (31), one or more two references retaining elements (31a), (31b) and so on are chosen with the mouse (6) for the code configuration. In the example shown in the diagram, two of the two references retaining elements (31c) and (31d) are selected in this way.

As shown in FIG. 11, the same digital code in the y-axis direction and in the x-axis direction of the checkerboard-like substrate (31) is displayed as the digital code that was assigned to each square—shaped division in the base checkerboard-like substrate (30). For example, the digital code that is assigned to the selected two references retaining element (31c) in the checkerboard-like substrate (31) shown by the arrows is [2] in the y-axis direction and [6] in the x-axis direction. Similarly the digital code that is assigned to the two references retaining element (31d) is [3] in the y-axis direction and [7] in the x-axis direction. Moreover, the order of the digits comprising the digital code [26] allotted to the two references retaining element (31c) is due to the priority order of the black and the white areal codes of the base checkerboard-like substrate (30). Similarly, the order of the digits comprising the digital code [37] allotted to the two references retaining element (31d) is due to the priority order of the black and the white areal codes of the base checkerboard-like substrate (30). In other words, the base checkerboard-like substrate (30) and the checkerboard like substrate (31) are arranged into a layered hierarchy explained in the following. In this positional relationship within the hierarchy, the description is performed according to the black and the white areal codes of the two references retaining element in the base checkerboard-like substrate (30), whose position is the same in the x-axis direction and in the y-axis direction, as well as whose position is completely overlapped in the vertical direction.

This means, for instance, that it is described according to the priority order of the black and the white areal codes of the two references retaining element (30c) in the base checkerboard-like substrate (30), whose position is the same in the x-axis direction and in the y-axis direction, as well as whose position is completely overlapped in the vertical direction. In this case, if the black colour has the highest priority, as in the example shown in the diagram, the two references retaining element (31c) becomes [26], and the two references retaining element (31d) becomes [73]. When the digital code of the two references retaining element (31) whose specification was performed earlier is described first the resultant code becomes [2673]. From this configuration, if the black and white areal codes are switched via the shuffling mechanism, the two references retaining element (31c) becomes [63] and the two references retaining element (31d) becomes [37]. As a result, the code changes to [6237].

The final code is obtained by adding the fixed password to the above configuration. However, the password characteristics will not be discussed here. Next, as shown in FIG.

12, the base checkerboard-like substrate (30) and the checkerboard-like substrate (31) become the code configuration screen with the layered hierarchy. On this screen the following icons are displayed. The icon (33a) is used to give the black areal code the highest priority while the icon (33b) is used to give the white areal code the highest priority. The icon (33c) is used to select the shuffling. The icon (33d) is used to select the rotational mode. Finally, the input window (33e) is used to enter the rotation time for the case when the rotational mode is selected. Each of the above selections can be specified using the mouse (6) or the keyboard (5) as input devices. The shuffling of the black and the white areal codes is performed at random, similarly to the other Examples mentioned before. However, the time intervals of the shuffling can be specified.

The relationship between the positions of the base checkerboard-like substrate (30) and checkerboard-like substrate (31) is recorded on the floppy disk (7) in the external file, through the interface (7b) and the floppy disk drive (7a). This includes the relationship between the positions of the black and the white areal codes in the base checkerboard-like substrate (30). Moreover, the configured code may be recorded on the floppy disk (7) as well.

Figure 12:
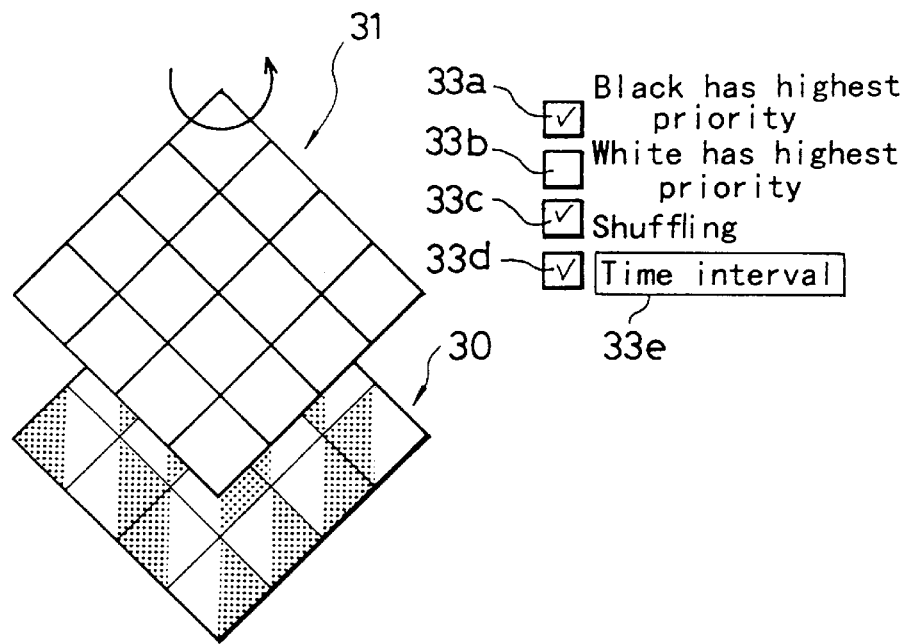
FIG. 12 is a diagram which explains the code input screen, in Example 3.
Figure 13:
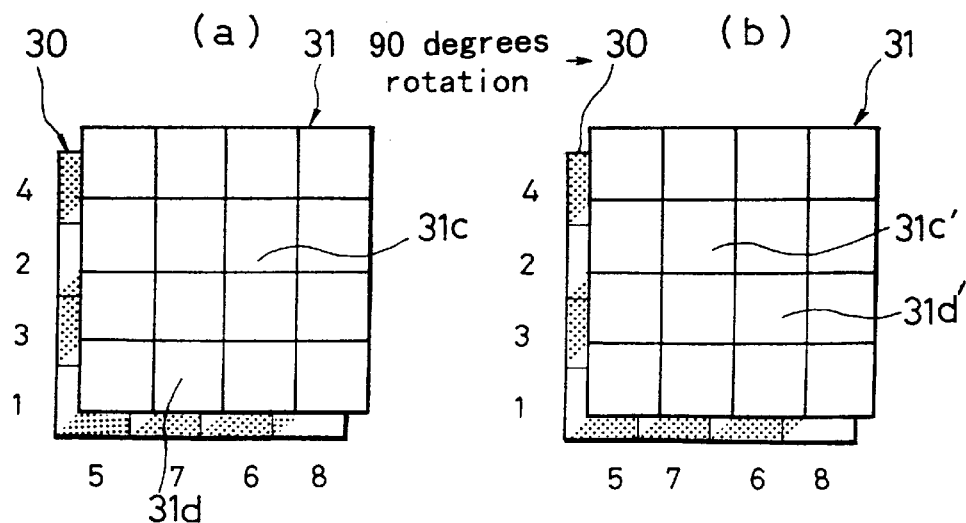
FIG. 13 is a diagram which explains the process of changing the code for the case in which the position of the checkerboard-like substrate, which is arranged in a layered hierarchy, is rotated 90 degrees, indicated by the location of the points in FIG. (a) and FIG. (b).

Consider the case in which the rotational mode, of the checkerboard-like substrate (31) with layered hierarchy, is chosen. If the rotation is 90 degrees in the counter clockwise direction from the starting position (see FIG. 13(a)) as shown in FIG. 12, the position of the two references retaining elements (31c) and (31d) are displaced to (31c') and (31d'), respectively, as shown in FIG. 13(b). The new code is generated based on this displacement. That is, when the black areal code is described first, as mentioned before, the digital code of the x-axis position and the y-axis position of the two references retaining element (30c') (see FIG. 10) in the base checkerboard-like substrate (30), whose position completely overlaps this two references retaining element (31c') that was just displaced, becomes [72]. Moreover, when the black areal code is described first as mentioned above, the digital code of the x-axis position and the y-axis position of the two references retaining element (30d') (see FIG. 10) in the base checkerboard-like substrate (30), whose position completely overlaps this two references retaining element (31d') that was just displaced, becomes [36]. Consequently, when the checkerboard-like substrate (31) rotates 90 degrees, the new code [7236] is configured. In this way, every time that the checkerboard-like substrate (31) rotates 90 degrees, a new code is generated. Each time the new code is generated, it is recorded in the code file (101).

For the case of accessing the data, first, the data on the floppy disk (7) is read through the floppy disk drive (7a) and the interface (7b). However, during this data accessing, the identifier recorded on the floppy disk (7) is checked with the identification data checking device (7c), to ensure that the file on the floppy disk (7) is a legitimate external file. After this verification is performed, the checkerboard-like substrate (31) is returned to its initial code configuration, based on the data from the floppy disk (7), as shown in FIG. 12. The positions of each of the black and the white areal codes of the base checkerboard-like substrate (30) is returned to their initial code configuration as well. By performing these operations, the initial code, before the rotation shown in FIG. 12, is recorded in the code file (101). In this situation, data accessing is performed by entering the code that was initially configured.

Example 4

Example 4 will be explained by referring to FIGS. 14 to 17. This Example 4 builds upon the setup of Example 3. The base checkerboard-like substrate (40) (see FIG. 14), and the checkerboard-like substrate (41) (see FIG. 15) are similar to the base checkerboard-like substrate (30) (see FIG. 10, etc.), and the checkerboard-like substrate (31) (see FIG. 11, etc.) of Example 3 described above. They are similar in terms of their compositions, their assignment of the digital codes, their code configuration procedure, their code variation due to the rotation, and so on. In addition to this, Example 4 includes one or more colour substrates, as two references retaining elements that are arranged into a layered hierarchy.

Figure 14:
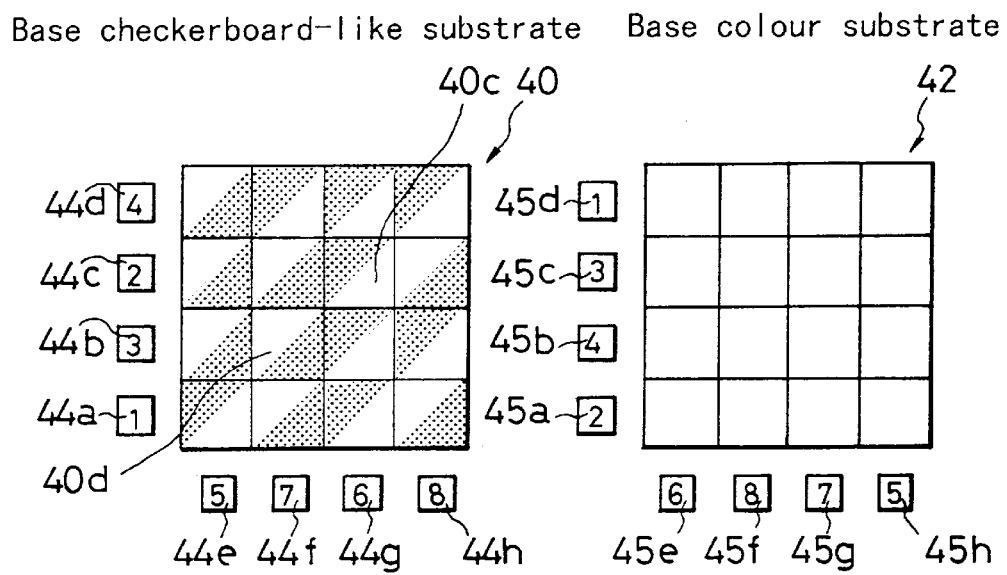
FIG. 14 shows a digital code assignment screen for the base checkerboard-like substrate and the colour substrate, in Example 4.

First, the digital code assignment screen, shown in FIG. 14, is read from the prescribed references retaining element file of the file group 8. This digital code assignment screen is where the digital codes, in the y-axis direction and the x-axis direction of the base checkerboard-like substrate (40) and the base colour substrate (42) are assigned. Similarly to Example 3 mentioned above, the digital codes which are displayed in the y-axis direction of the input windows (44a) to (44d) of the base checkerboard-like substrate (40), and the digital codes which are displayed in the x-axis direction of the input windows (44e) to (44h) of the base checkerboard-like substrate (40), are entered by the keyboard (5), in order to be assigned. In the example shown in the diagram, the digital code [1324] in the y-axis direction and the digital code [5768] in the x-axis direction are assigned. Next, the digital codes which are assigned are entered into the input windows for the digital code assignment, (45a) to (45d) and (45e) to (45h), of the base colour substrate (42). In the example shown in the diagram, the digital code [2431] in the y-axis direction and the digital code [6875] in the x-axis direction are assigned, respectively.

Figure 15:
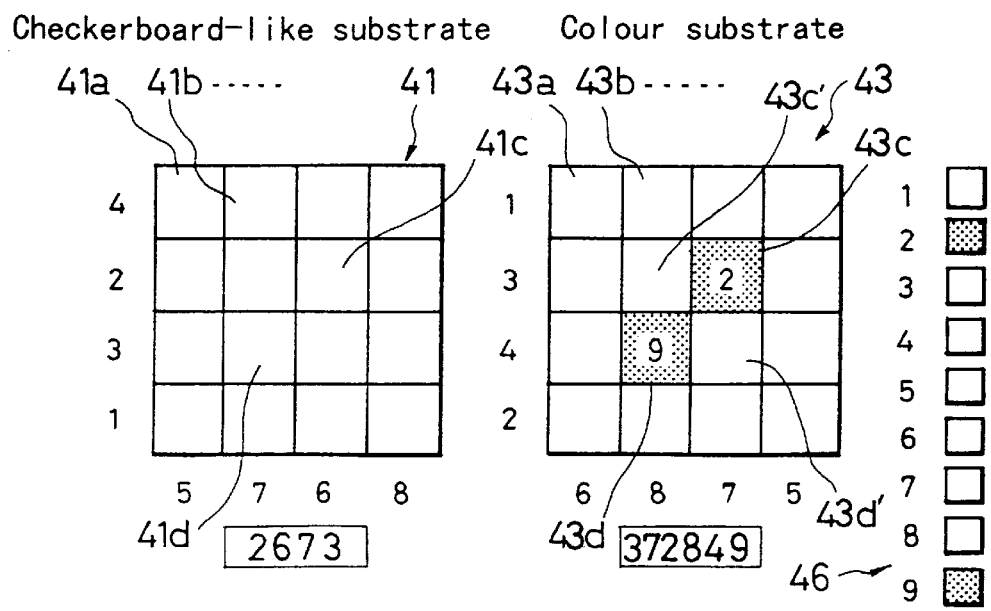
FIG. 15 shows a code configuration screen for the checkerboard-like substrate and the colour substrate, in Example 4.

After the assigning of this digital code has been completed, the code configuration screen given in FIG. 15 is displayed. One or more two references retaining elements (41a), (41b) and so on which are selected for the code configuration are specified by the mouse (6), for each of the two references retaining elements (41a), (41b) and so on, in the checkerboard-like substrate (41) as explained in Example 3. In the example shown in the diagram, the two references retaining elements (41c) and (41d) are specified and selected. Next, the two references retaining elements (41a), (41b) and so on, in the colour substrate (43), are specified to be selected for the code configuration. The positions and the numbers of the selected two references retaining elements (41a), (41b) and so on are assigned at will. However, in this Example, if the two references retaining elements (41c) and (41d) in the checkerboard-like substrate (41) are selected, the two references retaining elements (43c) and (43d) in the colour substrate (43) that have the same positions as that of the selected two references retaining elements (41c) and (41d), that is, that have the same y and x coordinates, and, at the same time overlap completely in the vertical direction, are selected simultaneously.

Next, from the colour guide (46), a random colour is dragged by the mouse (6) and placed onto the selected two references retaining elements (43c) and (43d). As a result of this operation, the colour guide (46) displays, for example, 9 colours from red to purple. This assigns the digital codes from 1 to 9, and the random colours from this colour guide (46) are put into the selected two references retaining elements (43c) and (43d), by dragging it with the mouse (6). By this procedure, the two references retaining elements (43c), (43d) are coloured by the set colour, and the digital code which is attached to each colour is configured in each input window of the two references retaining elements (43c) and (43d). In the example shown in FIG. 15, the two references retaining element (43c) receives the colour that is attached to the digital code [2] and its input window is assigned the digital code [2]. Moreover, the two references retaining element (43d) is given the colour that is attached to the digital code [9] as well as having its input window assigned the digital code [9]. Further, the usable number of colour in the colour guide (46) is the maximum possible number of colours that the computer can recognize.

As a result of the assignment of the above digital code, the digital code assigned to the two references retaining element (43c) becomes [3] in the y-axis, [7] in the x-axis, and [2] according to the colour guide (46). Moreover, the result of the assignment of the above digital code is that the digital code assigned to the two references retaining element (43d) becomes [4] in the y-axis, [8] in the x-axis, and [9] by the colour guide (46). The description of the priority order of the digital code by the y-axis and x-axis is decided by the priority order of the areal code of the black and the white areas of the two references retaining elements (40c) and (40d) in the base checkerboard-like substrate (40) whose positions completely overlap in the vertical direction of the two references retaining elements (43c) and (43d). If the black has the highest priority, as in the example shown in the diagram, the digital code that is allotted to the two references retaining element (43c) of the color substrate (43) becomes [37] and the digital code that is allotted to the two references retaining element (43d) of the color substrate (43) becomes [84]. After the above procedure is performed (before the above procedure is acceptable as well), the two references retaining element (43c) becomes [372] and the two references retaining element (43d) becomes [849] , when the digital codes are assigned to each of them by using the colour guide (46). The code that is generated for the colour substrate (43) is [372849]. By combining the code that is configured for the checkerboard-like substrate (41) together with the code generated for the colour substrate (43) results in the code [2673372849]. By adding the fixed password to this code, the final code is generated. However, the details of the password entry is not treated here.

Further, without adding the colour by the colour guide (46), only the digital code allocation can be performed. In this procedure, if the colour is not added, the checkerboard-like substrate (41) is not distinguishable on the visual display screen of the CRT 4. Therefore, the configured code can be hidden. The configured code is not known, whether it is based on the assigned digital code on the base checkerboard-like substrate (40) or whether it is based on the assigned digital code of the base colour substrate (42).

Figure 16:
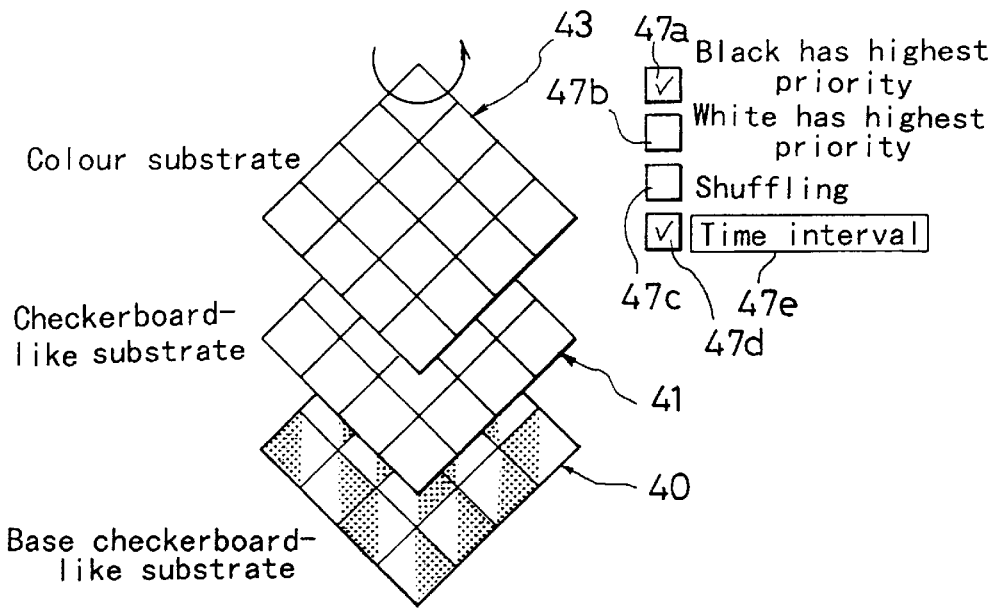
FIG. 16 shows a code configuration screen in Example 4.
Figure 17:
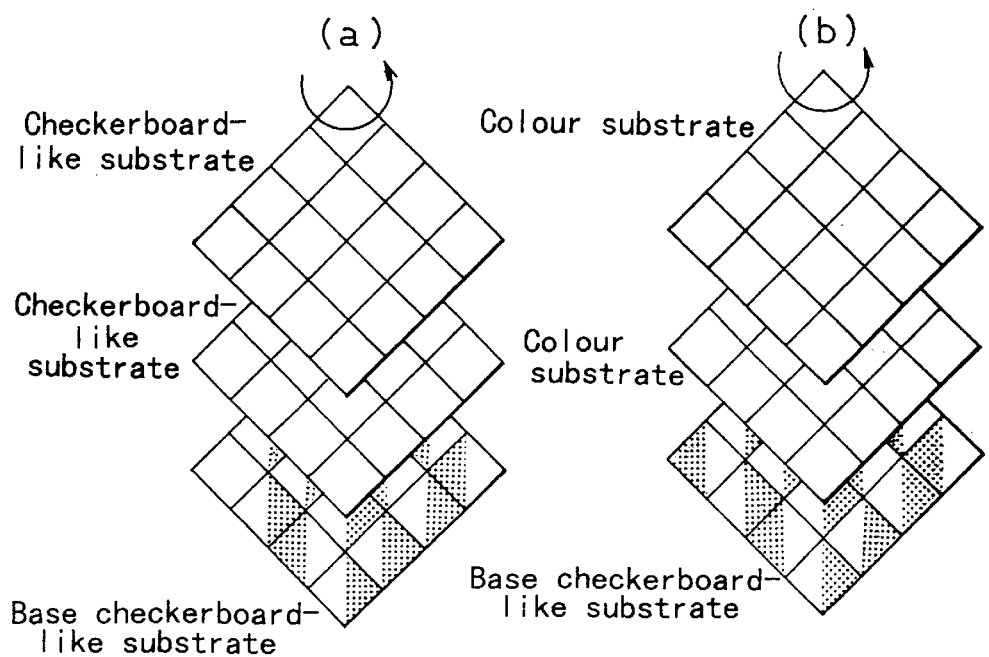
FIG. 17 is a diagram which shows the other configurations in Example 4.

After completing the above configuration, the code configuration screen is displayed, with the layered hierarchy of the base checkerboard-like substrate (40), the checkerboard-like substrate (41) and the colour substrate (43) as shown in FIG. 16. Similarly to the other examples mentioned above, the following icons are displayed on the screen: the icon (47a), which is used to select the black areal code as the one with the highest priority, as discussed above; the icon (47b) which is used to select the white areal code as the one with the highest priority; the icon (47c) which is used to select the shuffling; the icon (47d) which is used to select the rotational mode; and the input window (47e) which is used to enter the rotation time for the cases in which the rotational mode is selected. The mouse (6) and/or the keyboard (5) is used to enter each of the above selections. The shuffling of the black and the white areal codes is performed at random, similarly to the other examples mentioned before. However, the time interval of the shuffling can be specified, similarly to the other examples mentioned before.

If the rotational mode of the checkerboard-like substrate (41) and the colour substrate (43) is chosen, the code changes every 90 degrees of rotation, similarly to Example 3. However, the colour substrate (43) is changed based on the digital code that is assigned to the both the y-axis direction and the x-axis direction in the base checkerboard like substrate (42) (see FIG. 14). This is the difference between this example and Example 3 mentioned above. Therefore, for the colour substrate (43) shown in FIG. 15 and FIG. 16, if the rotation of 90 degrees counter clockwise with respect to the starting position occurs, as shown in the diagram, the two references retaining elements (43c) and (43d) are displaced to the positions identified by (43c') and (43d'), respectively. In this case, the newly configured code at this position is the following. If the areal code of the base checkerboard-like substrate (40) has the black code as the highest priority, the two references retaining element (43c') becomes [83], and the two references retaining element (43d') becomes [47]. So, adding the digital code from the colour guide (46) of the colour substrate (43) to these digital codes results in a newly generated code of [832479].

The rest is similar to Example 3. Moreover, in this Example 4, the checkerboard-like substrate (41) is above the base checkerboard-like substrate (40). On top of this checkerboard-like substrate (41) is the colour substrate (43) with the layered hierarchy. However, as shown in FIG. 17(a), there can be several checkerboard-like substrates arranged with this hierarchy on top of the base checkerboard-like substrate. Further, as shown in FIG. 7(b) there can be only colour substrates arranged with this hierarchy, on top of the base checkerboard-like substrate. By increasing or decreasing the number of the checkerboard-like substrates and colour substrates, which are located above the base checkerboard-like substrate with the layered hierarchy, the amount of security can be set to the desired level.

Example 5

Figure 18:
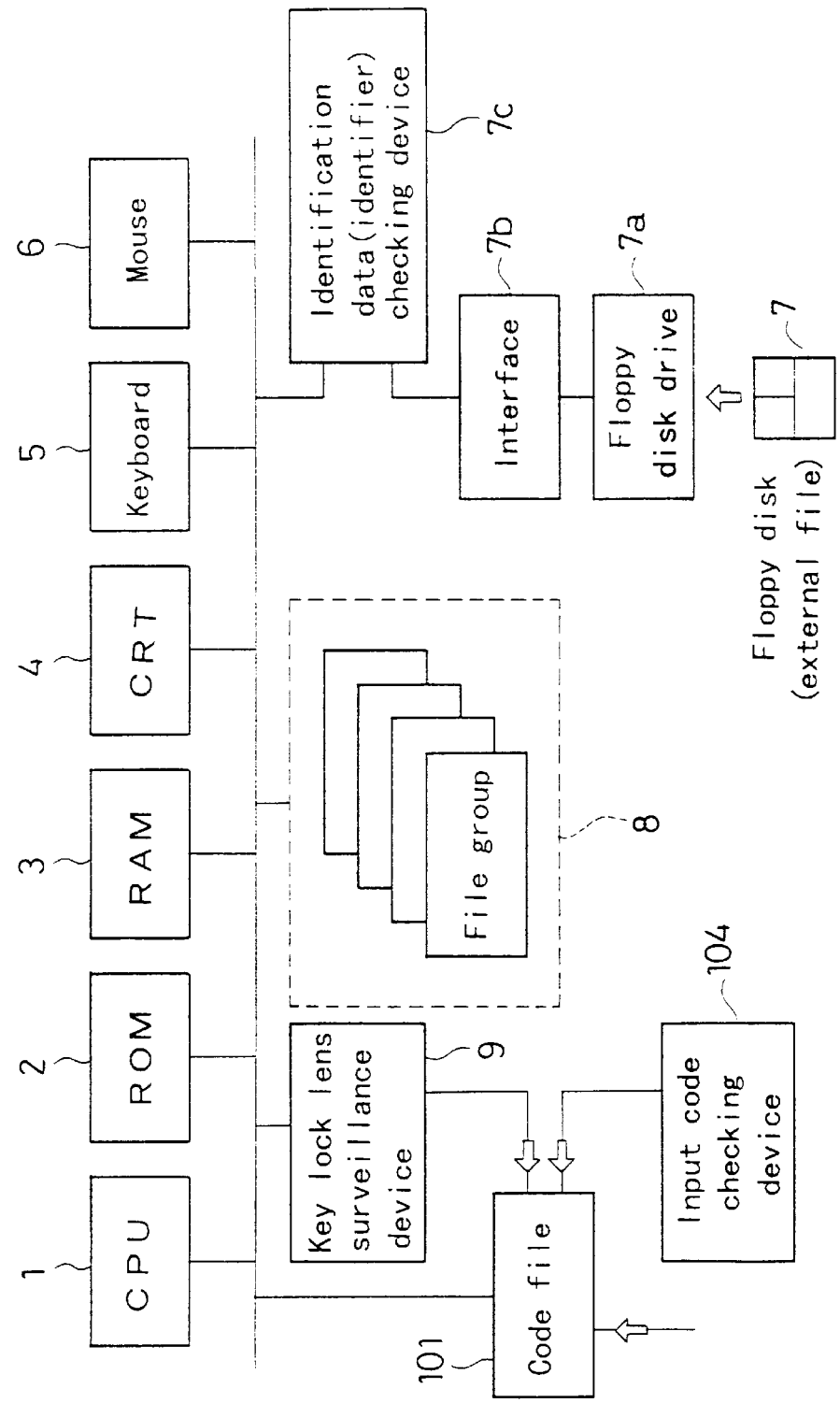
FIG. 18 is a diagram which shows the structure of the control system in Example 5.
Figure 20:
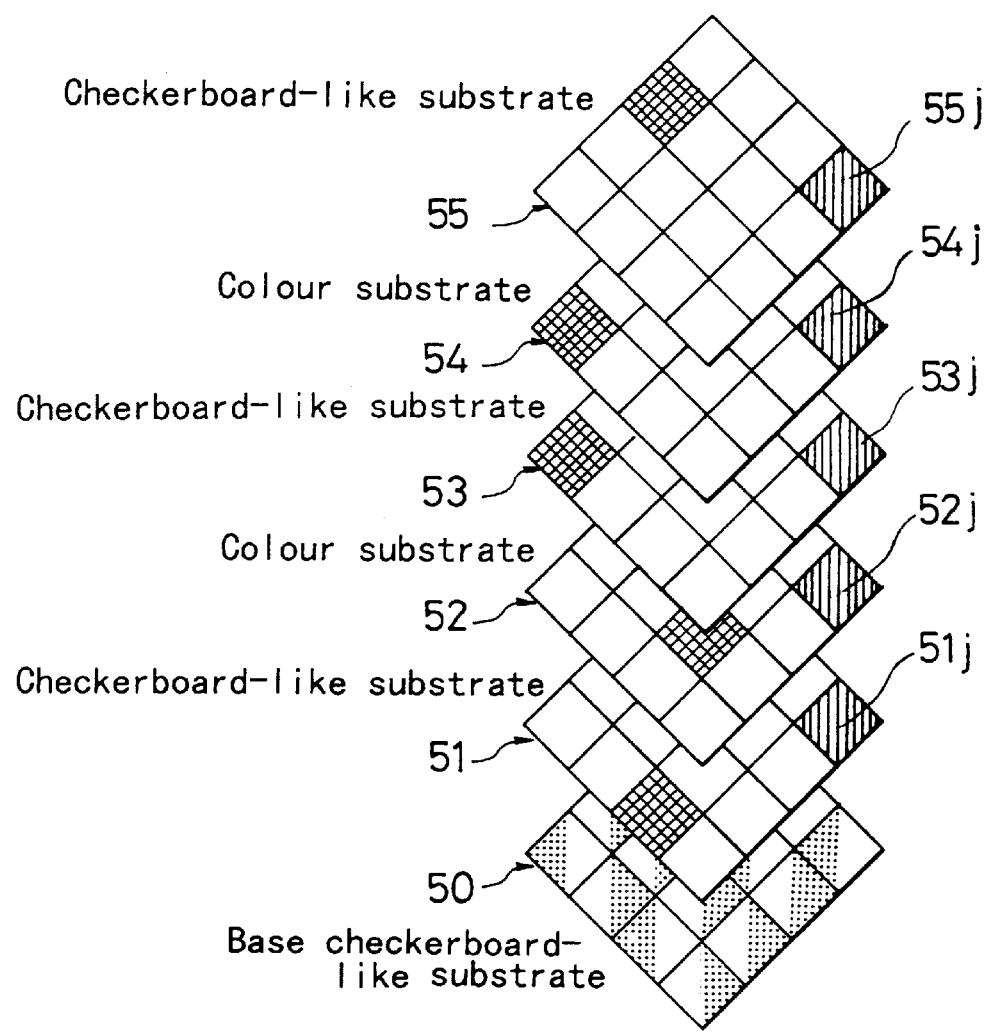
FIG. 20 is a diagram which shows the focused lenses configured on each of the substrates.
Figure 21:
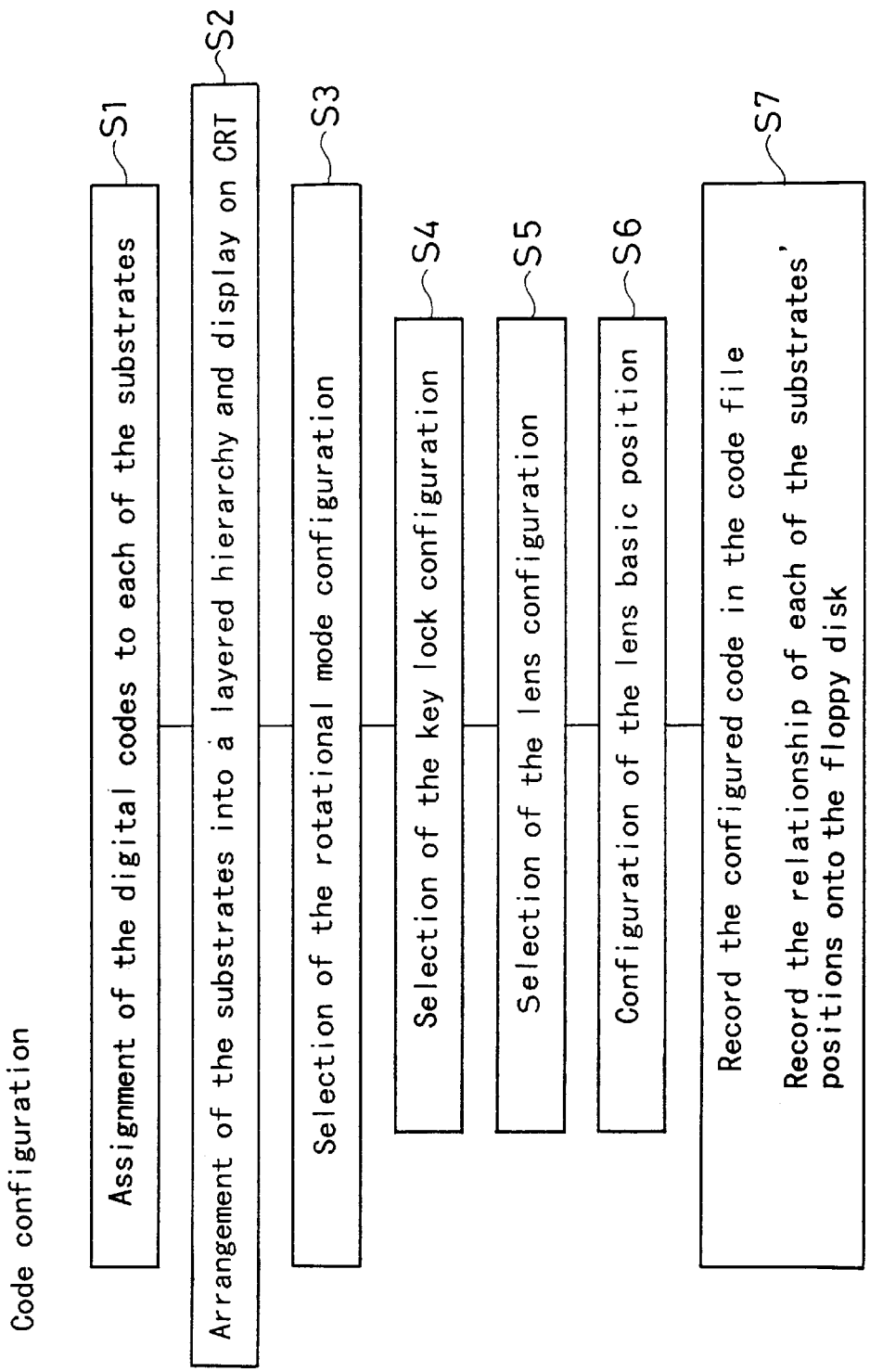
FIG. 21 is a flowchart which explains the configuration of the code in Example 5.
Figure 22:
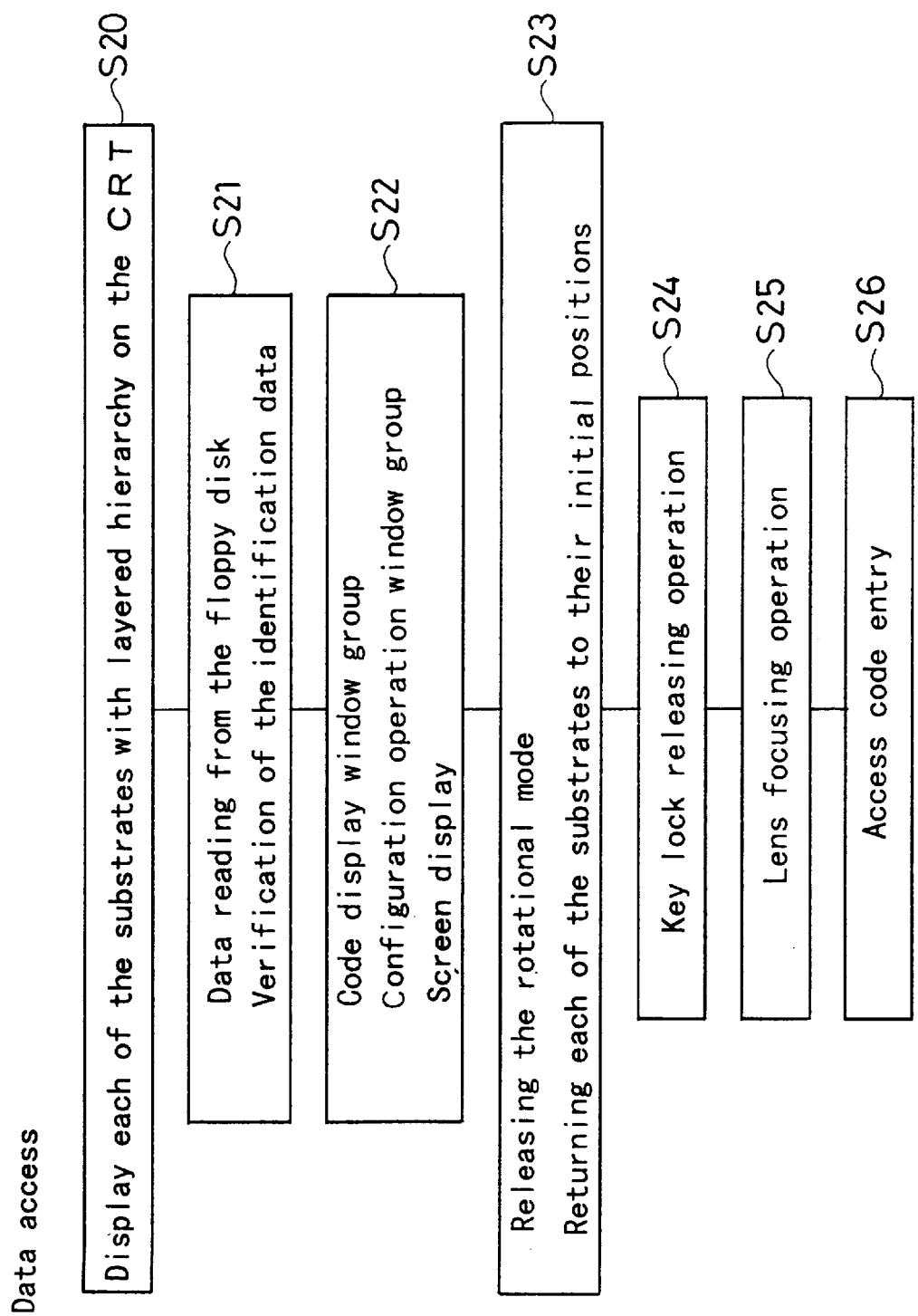
FIG. 22 is a flowchart which explains the data access in Example 5.

Example 5 will be explained by referring to FIGS. 18 to 20, as well as to the flowcharts from FIG. 21 and FIG. 22. In this Example 5, the "key lock" mechanism and the function of the "lenses" are added to Examples 3 and 4. FIG. 18 shows control composition diagram of Example 5. The difference found in the similar control composition diagram of FIG. 2 is that the key lock—lens surveillance device (9) is provided. The rest of the set up is similar to that of the previous examples. The key lock lens surveillance device (9) monitors whether the key lock exists or not and whether the lenses are attached or not as well as their locations. This will be discussed later. Under the prescribed conditions, the key lock—lens surveillance device (9), does not accept the code verification from the input code checking device (104), shown in FIG. 1. In the following, the explanation is given based on the flowcharts shown in FIG. 21 and in FIG. 22.

First, in the procedure explained in Examples 3 and 4, the digital code is assigned to each of the checkerboard-like substrates and each of the colour substrates (51) to (55) (Step S1). After completing this digital code assignment, the code configuration screen of FIG. 19 is displayed (Step S2). In this Example, the checkerboard-like substrate (51), the colour substrate (52), the checkerboard-like substrate (53), the colour substrate (54) and the checkerboard-like substrate (55) are arranged with layered hierarchy on top of the base checkerboard-like substrate (50).

Figure 19:
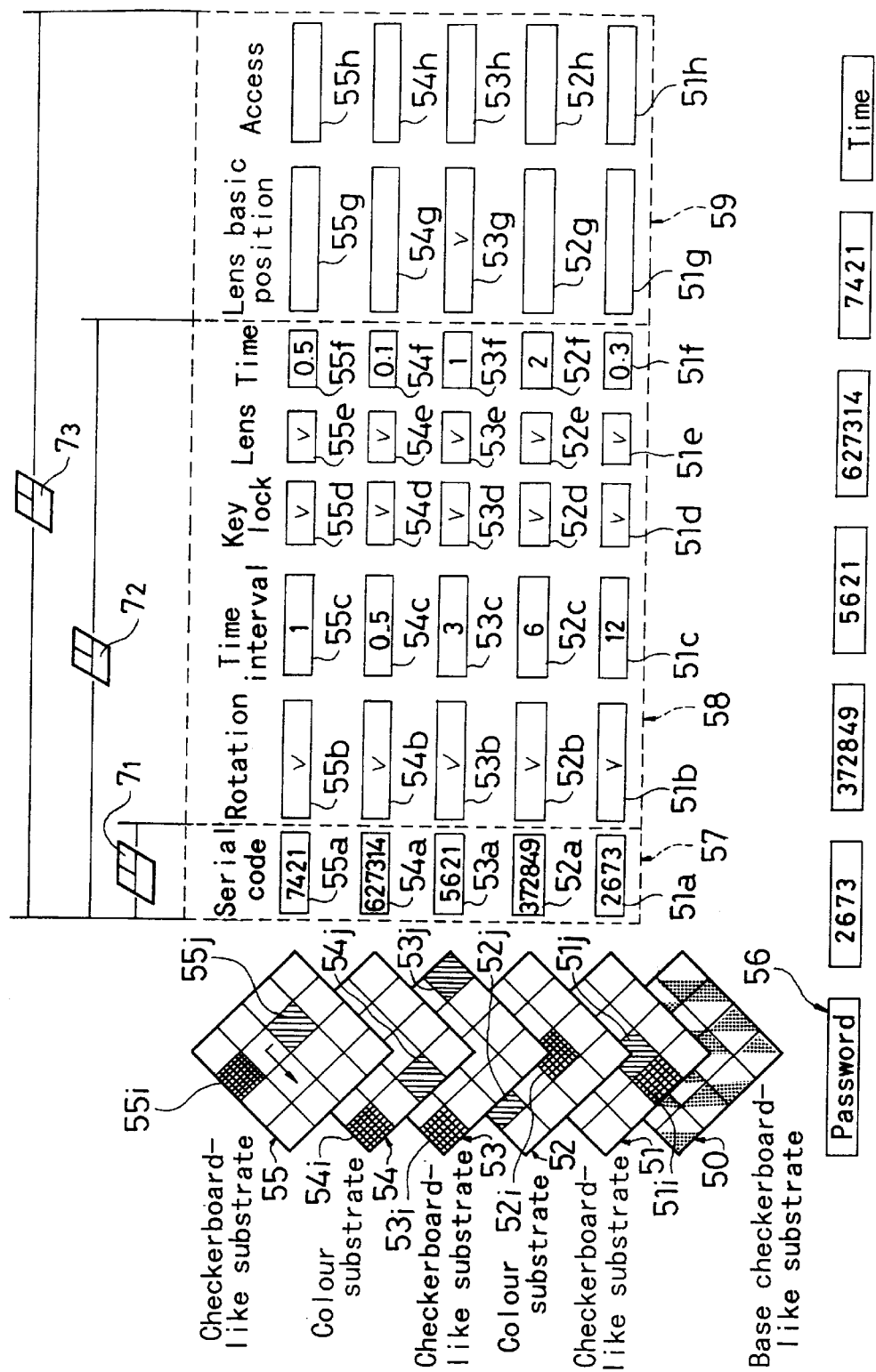
FIG. 19 shows a code configuration screen in Example 5.

The code on the code configuration screen of FIG. 19 assigned by the procedure in Examples 3 and 4 is displayed as a serial code on the display windows (51a) to (55a) in the code display window group (57). If, for example, the checkerboard-like substrate (51) is in the form of the checkerboard-like substrate (41) of the Example 4 (see FIG. 15), the serial code that is shown on the display window (51a) is [2673]Moreover, if the colour substrate (52) is in the form of the colour substrate (43), in Example 4, the display window (52a) displays [372849]. In the same way, the other display windows (53a) to (55a), display the serial codes that are already assigned, as well. Further, on the serial code display device (56) located at the bottom of the screen, the serial codes are consecutively displayed. At the beginning of the display, the fixed password, which has already been entered, is displayed. Then, the serial code [2673] of the checkerboard-like substrate (51) is displayed. Next, the serial code [372849] of the colour substrate (52) is displayed. The serial codes of the checkerboard-like substrates or colour substrates are displayed starting from the lowest substrate to the uppermost substrate. Then, at the end of this, the time of the code configuration is displayed.

Next, the configuration of the first configuration operational window group (58) is performed. First, in each checkerboard-like substrate and colour substrate (51) to (55), the icons (51b) to (55b) are chosen by clicking the mouse (6), whether the rotational mode is selected or not (Step S3). If the rotational mode is selected, the rotation time interval is entered from the keyboard (5) into each of the input windows (51c) to (55c). For instance, the checkerboard-like substrate (51) can be configured so that it rotates once every 12 hours, see input window (51c), and the colour substrate (54) can be configured so that it rotates once every 30 minutes, see input window (54c). The rotation time can be specified in terms of the time interval required for a rotation of 90 degrees.

Next, by selecting the icons (51d) to (55d) with the mouse (6), each of the checkerboard-like substrates and the colour substrates (51) to (55) can be set up so that the key lock is set (Step S4). If this key lock configuration is selected, in the checkerboard-like substrates and in the colour substrates (51) to (55), the key locks (51i) to (55i) are configured in the randomly located two references retaining element. When the key lock is configured in this fashion, the monitoring by the key lock surveillance device (see FIG. 18) prevents the code entry to the code file (101). This is true until the key lock is released by clicking the icons (51d) to (55d) another time with the mouse (6), which disables the key lock. In other words, even if the correct code, recorded in the code file (101), is entered, if the key lock is enabled, the code entry for the data access will not be accepted.

Next, by selecting each of the icons (51e) to (55e), the lenses can be configured (Step S5). When the lens configuration is selected, the lenses (51j) to (55j) in each of the checkerboard-like substrates and the colour substrates (51) to (55) are configured in the randomly located two references retaining element. If the lenses are thus configured, the displacement times of the lenses are entered into each of the displacement time input windows of the lenses (51f) to (55f) The lens displacement is explained, for example by the checkerboard-like substrate (55). The displacement is from the position of the original configuration of the lens (55j) to another, randomly determined, position on one of the other two references retaining elements, as shown by the arrow, in a pre-defined time interval. The lenses (51j) to (55j) that are configured on the other checkerboard-like substrates and the colour substrates (51) to (55) are displaced randomly with respect to the other two references retaining elements' positions on the same plane by entering the lens displacement time. As explained later, unless the positions of each of the lenses completely overlap in the vertical direction, the code entry for the data access is not accepted. When the positions of each of the lenses overlap, the lenses are said to be in focus (see FIG. 20). This is also referred to as focus-matching.

Finally, the second operational configuration window group (29) is entered. This entry is performed in the following manner. The lens basic position is configured on each of the substrates (51) to (55) where the lenses (51j) to (55j) were configured by clicking one or any of the icons (51g) to (55g) (Step S6). The configuration of this lens basic position, where the lenses are in focus, is defined as follows. The lenses are randomly displaced with respect to each of the two references retaining elements in each of the substrates (51) to (55). In FIG. 19, the icon (53g) is clicked and the position of the lens (53j) that is configured on the checkerboard-like substrate (53), is defined to be the lens basic position. Further, in order to reset the configured lens basic position, the icon which was clicked when it was configured, namely, the icon (53g), is clicked another time. This cancels the lens basic position setting.

The code configuration is completed according to the procedure. The serial code that is generated in this fashion is recorded in the code file (101). The following relationships and configurations are recorded through the interface (7b) and the floppy disk drive (7a) onto the floppy disk (7) in the external file (Step S7). The relationship between the positions of the base checkerboard-like substrate (50), and the checkerboard-like substrates and the colour substrates (51) to (55), as well as that between the positions of the black and white areal codes are recorded. The configurations of the key—lock and lenses, as well as that of the lens basic position are recorded. Additionally, the serial code that is generated (the code that displayed in the serial code display device (56) in FIG. 19) can also be stored onto the floppy disk (7).

The procedure of the data access in the Example 5 will be explained based on the flowchart shown in FIG. 22. First, each of the substrates (50) to (55) arranged in the layered hierarchy, as well as the display data in the serial code display device (56), where the only input frame is displayed, are read from the prescribed file in the file group (8) and displayed on the CRT (4) (Step S20). Then, the data recorded on the floppy disk (7), is read (Step S21). Subsequently, with the identification data checking device (7c), the identifier that is recorded on the floppy disk (7) is checked and the verification of whether the floppy disk (7) contains the proper external file is performed. According to this verification, based on the data that is read from the floppy disk (7), the code display window group (57), the first configuration operation window group (58) and the second configuration operation window group (59) are displayed on the screen (Step S22).

First, the mouse (6) is used to select the rotational mode and to disable the rotational mode by clicking the icons (51b) to (55b). As a result, the rotation of each of the substrates (51) to (55) is stopped. Further, each of the substrates (51) to (55) return to their starting positions, based on the position data recorded onto the floppy disk (7) (Step S23). Moreover, the positions of the black and white areal codes of the base checker-board-like substrate (50), are also returned to their starting positions. Consequently, the code that is recorded in the code file (101) is reset to that at the start.

Subsequently, the cancellation of the key lock is performed (Step S24). This cancellation is performed by clicking, with the mouse (6), the icons (51d) to (55d) used to select whether the key lock is on or off. This process releases the key lock of each of the substrates (51) to (55). The icon (53h) utilized to access the data of the checkerboard-like substrate (53) that is configured as the lens basic position (Step S25), is clicked. By this clicking, the lenses (51j) to (55j), which are randomly displaced on the two references retaining elements of each of the substrates (51) to (55), are displaced to the location of the lens (53h) on the checkerboard-like substrate (53) configured as the lens basic position as shown in FIG. 20. Then, each of the lenses (51j) to (55j) are arranged to line up in the vertical direction. In this configuration, they are said to be in focus. In this situation, the serial code is put into the serial code display device (56), shown in FIG. 19 (Step S26). This entered code is verified by the input code checking device (104) shown in FIG. 1. Only then is the data access made possible.

As mentioned above, when the verification signal comes from the input code checking device (104) to the code file (101), the key lock lens surveillance device (9) verifies whether the key lock is released or not. In the event that the key lock is not released, the verification signal is not accepted. Similarly, the key lock lens surveillance device (9), verifies whether the configured lenses (51j) to (55j) are in focus or not. As long as the configured lenses are not in focus, the key lock lens surveillance device (9) does not accept the verification signal. In this case, since the code verification is not possible, the accessing of the data is not permitted, either. With this setup, for example, illegal accessing of the mentioned code file (101) and analysis of the recorded code is not sufficient to grant access to the protected data. Further, in the event that the configuration of the lens basic position of the second configuration operation window group (29) is not performed, as shown in FIG. 19, data accessing is made possible by clicking the lens configuration icons (51e) to (55e) of the first configuration operation window group (28), with the mouse (6) to release the lens configuration.

Example 6

Figure 23:
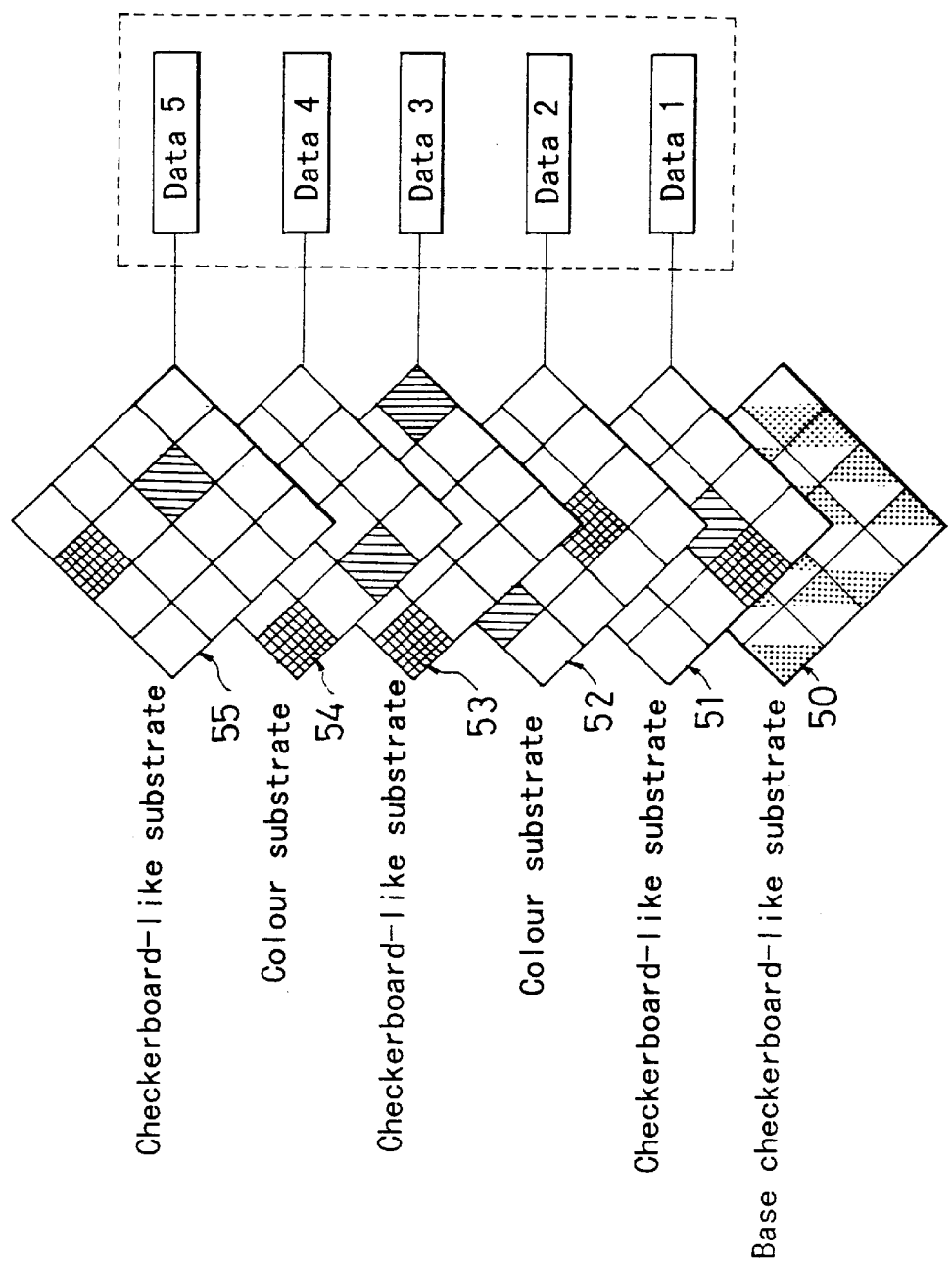
FIG. 23 is a diagram which shows how the data is connected to each of the substrates in Example 6.

Example 6 enables access to each of the data (1) to (5) individually by making the data (1) to (5) related to the each of the checkerboard-like substrates and colour substrates (51) to (55) in addition to the setup Example 5 as shown in FIG. 23. Basically, the code, which is configured by each of the substrates 51 to 55, is recorded in the code file (101), similarly to the Example 5. This code is used to access each of the data (1), data (2), data (3), data (4) and data (5), which are related to each of the substrates (51) to (55). For instance, for the case of accessing the data (1), as in the example shown in FIG. 19, in addition to the prescribed password and the time input, the code input becomes [2673]. Utilizing this code, after receiving the verification from the input code checking device (104), access to the data (1) is granted. In this case, the disabling of the rotational mode, the key lock, and the lens basic position are performed, and, the configured lens is reset.

Now, the floppy disk (7) can be divided into 3 portions, and different persons can administer the floppy disk $7_1$, the floppy disk $7_2$ and the floppy disk $7_3$. For this case, the three floppy disks are explained in the following, as shown in FIG. 19. The first floppy disk $7_1$ which functions as the external floppy disk that records the screen data enables the data entry of the code display window group (57). The floppy disk $7_2$ which functions as the external floppy disk that records the screen data enables the data entry of the code display window group (57) and the first configuration operation window group (58). Finally, the floppy disk $7_3$ which functions as the external floppy disk that records the screen data enables the data entry of the code display window group (57), the first configuration operation window group (58) and the second configuration operation window group (59). Moreover, the administrator of the third floppy disk $7_3$ can prohibit all of the data from being accessed by entering the second configuration operation window group (59) to configure the lens basic position to the random checkerboard-like substrate or colour substrates (51) to (55). This can be done outside of normal business hours, for example. During normal business hours, data accessing can be handled by the following. The administrator of the third floppy disk $7_3$ unsets the lens basic position. The head of the site decides whether to give permission to access the data (1) to the data (5) or to deny such access (see FIG. 23). This is performed for each individual data using the second floppy disk $7_2$ through the configuration and the disabling of the rotation mode, and the configuration of the key lock and the lens. The person attempting to access the system and its data, inputs the access code that was previously provided to them, using the first floppy disk $7_1$.

Moreover, the data can be limited to the persons who administer the floppy disk 7,and the floppy disk $7_2$. For example, if the administrator of floppy disk $7_2$ only has access to the data (1) and the data (3), as shown in FIG. 23, the second floppy disk $7_2$ records only the following data. The second floppy disk $7_2$ records the screen display data of only the input windows (51a) and (53a) of the code input window group (57), the icons (51b), (51c), (53b), (53c) for the rotational mode configuration in the first configuration operation windows group, the icons (51d) and (53d) for the key lock configuration, and the icons (51e), (51f), (53e), (53f) for the lens configuration. As a result, access to the other data is not permitted. In this way, the present invention can specify the persons eligible to access the protected data, depending upon the importance of the data. Furthermore, permissions can be set to restrict access to certain data to only a select group of individuals. Different individuals can be given access to different data.

As explained above, the present invention ensures a reliable security code as well as a reliable access code in order to prevent illicit access to the protected data by periodically changing the code according to the following code configuration procedures. By arranging the checkerboard-like substrates on the base checkerboard-like substrate into a layered hierarchy, and at the same time rotating the checkerboard-like substrates, the configured code is intricately changed, thereby achieving reliable security and access codes.

Moreover, by including a key lock to the checkerboard-like substrates, entered codes, for accessing the data, will not be accepted as long as the key lock is not released. Further, lenses can be configured onto the checkerboard-like substrates on top of the base checkerboard-like substrate and arranged with layered hierarchy, so that when they are not positioned such that they are completely aligned along the vertical direction, access to the data will not be granted. Also, by using the key lock mechanism and by recording the input screen data used to align each of the lenses to the external file, the entered code by itself is not sufficient to have access to the protected data. As a consequence, this ensures a reliable security code as well as a reliable access code that prevents illicit access to the protected data even if the code file and the code—input configuration device are broken into, or if the access code for the data is leaked or is deciphered.

Further, each of the checkerboard-like substrates is related to different data, and the data access of the each of the substrates is performed. At the same time, using the code configuration procedures of the key lock mechanism and of the lenses, a reliable access code as well as a reliable security code can be generated which can be used by the data administrator to determine whom can have access to which data.

What is claimed is:

1. A configuration method for a securitycode in order to provide at least one of access and protection to prescribed data, said method comprising the steps of:

assigning a digital element of the security code to both a first compartment area and a second compartment area, which are divided by a diagonal line, and at the same time, maintaining a references retaining element file which records a first areal code and a second areal code, respectively, for the first compartment area and the second compartment area, as a graphical image;

establishing an order of priority of the first areal code and second areal code that are recorded in the references retaining element file, and then configuring the security code using the order of priority of the digital elements, performed according to the order of priority of the first compartment area and the second compartment area, which are both assigned the first areal code or the second areal code that has the digital elements;

shuffling the first areal code and the second areal code are shuffled at prescribed or random time intervals after the step of configuring the code, according to this shuffling, configuring a new security code based on the priority order, and at the same time, recording this step of shuffling to the references retaining element file; and reading the prescribed data and displaying said prescribed data on a visual display unit when the prescribed data needs to be accessed, performing the step of reading the prescribed data by entering the security code that was generated according to the priority, based on the location of the first areal code and the second areal code.

2. A configuration method for an access code or for a security code as claimed in claim 1, wherein one of the first and second areal codes, in the references retaining element file, that is assigned one digital element, is recorded as a graphical image; and the step of configuring the code is performed by describing the digital element which is assigned to the one of the first and second areal codes either in the front of, or in the back of the digital element which is assigned to the other of the first and second areal codes.

3. A configuration method for a security code comprising:

providing a references retaining element file that records, as a graphical image, the reference retaining element, which includes a base two-references retaining element arranged into a hierarchy with at least one of a one-reference retaining element and a two-references retaining element;

assigning a first compartment area and a second compartment area of the two-references retaining element, which completely overlaps in the vertical direction the base two reference retaining element an identical digital element to that which is assigned to the corresponding first compartment area and the corresponding second compartment area of the base two-reference retaining element;

entering and configuring the security code, based on a prescribed priority order, between a first areal code and a second areal code of the two-references retaining element, and on the digital element, which is allotted to each reference retaining element under the previously prescribed order of each reference retaining element, and at the same time, recording the location and arrangement of each reference retaining element at the moment of the code configuration;

coaxially rotating the two-references retaining element, while keeping stationary the base two-references retaining element at random or prescribed time intervals after the configuration of the code, when the positions of the first compartment area and the second compartment area of the two-references retaining element are switched by the rotation, assigning the newly assigned digital codes to the switched first compartment area and the second compartment area, to allot these newly assigned digital codes to the first compartment area and the second compartment area of the base two-references retaining element, which overlaps the switched first compartment area and the second compartment area;

configuring a new security code by utilizing the newly assigned digital codes and by the shuffling of the first areal code and second areal code; and accessing prescribed data after returning to the position of the initial code configuration for each references retaining element, based on the records of each of the references retaining element's positional relationship.

4. A configuration method for an access code or for a security code as claimed in claim 3, wherein the positional relationship among each of the reference retaining elements at the time when the initial code was configured is recorded in an external file through an interface by which the data is given and received, and at the same time, when the data which is recorded in the external file is read, the external file identifier is set up in order to distinguish the external file.

5. A configuration method for an access code or for a security code comprising:

providing a base platform comprising an equal number of two references retaining elements arranged along the x-axis and y-axis directions on the same plane so that the diagonal lines extend toward the same direction and a references retaining element file, composed of two references retaining elements arranged in the same way as the arrangement of the base platform, which records the base platform and one or more additional platforms as a layered hierarchical graphical image on top of the base;

assigning a digital element to each compartment of the compartment two base platform along the x-axis direction and y-axis direction, said compartments separated by the diagonal line of the base platform such that the assigned digital element is the common digital element of a first compartment area and a second compartment area of each of the two references retaining elements in both the x-axis direction and the y-axis direction;

at the same time, choosing one or more of the two references retaining elements from each of the additional platforms, and assigning the digital element assigned to the two references retaining element of the base platform located in a vertically overlapped position from the chosen two references retaining elements to the chosen two references retaining elements of the platform;

configuring the code based on the assigned digital element and the priority order of first areal code and second areal code, and at the same time, recording the relationship between the locations of each reference retaining element at the time of the code configuration including the relationship between the locations of the first areal code and the second areal code;

coaxially and horizontally rotating the additional platform to the base;

when the chosen two references retaining elements are completely aligned in the vertical direction onto the new compartment two references retaining element of the base platform, assigning the digital element which is allotted to the two references retaining element to the two references retaining element by this rotation and at the same time, configuring a new code based on this assigned digital element and the previously prescribed priority order of the first areal code and second areal code; and in the event of data accessing, performing the code input after returning each of the references retaining elements to their initial positions based on the record of each of the references retaining element's relationship of the positions.

6. A configuration method for an access code or for a security code as claimed in claim 5, wherein the relationship of the positions among each of the reference retaining elements, at the time when the initial code was configured is recorded in an external file, where the data is given and received through an interface, and at the same time, an external file identifier is set up in order to distinguish the external file, when the data that is recorded in the external file is read.

7. A configuration method for an access code or for a security code as claimed in claim 6, wherein the digital element is assigned to each of the two references retaining elements in the additional platforms based on the digital elements assigned to each of the two references retaining elements along the x-axis direction and the y-axis direction in the base platform, and at the same time, the description order of the digital elements comprising the two references retaining element which are selected randomly is based on the priority order of the first areal code and second areal code in the base platform whose position completely overlaps that of the two references retaining element in the vertical direction, and the code configuration is performed with one or more additional platforms arranged above the base platform into hierarchical layers.

8. A configuration method for an access code or for a security code as claimed in claim 7, wherein during the initial code configuration lenses are configured onto any of the two references retaining elements which comprise each of the additional platform layers and, at the same time, after the code configuration is completed, each lens is displaced randomly to the other positions of the two references retaining elements on the same plane, and if the positions of each of the lenses are not completely aligned in the vertical direction on each of the additional platforms, the input of the access code is not accepted, and conversely, for the case of successful data accessing, when the position of each lens is aligned in the vertical direction, by the prescribed alignment operation, the input of the access code is accepted.

9. A configuration method for an access code or for a security code as claimed in claim 8, wherein screen data used to perform the key lock cancellation operation is recorded in the external file.

10. A configuration method for an access code or for a security code as claimed in claim 6, wherein each of the additional platforms arranged into hierarchical layers above the base platform is configured with a key lock, which requires the input of a disabling code in order to release it, and according to the prescribed cancellation operation, if the key lock is not cancelled, the code entry for the data accessing is not accepted.

11. A configuration method for an access code or for a security code as claimed in claim 10, wherein during the initial code configuration lenses are configured onto any of the two references retaining elements which comprise each of the additional platform layers and, at the same time, after the code configuration is completed, each lens is displaced randomly to the other positions of the two references retaining elements on the same plane, and if the positions of each of the lenses are not completely aligned in the vertical direction on each of the additional platforms, the input of the access code is not accepted, and conversely, for the case of successful data accessing, when the position of each lens is aligned in the vertical direction, by the prescribed alignment operation, the input of the access code is accepted.

12. A configuration method for an access code or for a security code as claimed in claim 11, wherein screen data used to perform the key lock cancellation operation is recorded in the external file.

13. A configuration method for an access code or for a security code as claimed in claim 10, wherein screen data used to perform the key lock cancellation operation is recorded in the external file.

14. A configuration method for an access code or for a security code as claimed in claim 6, wherein during the initial code configuration lenses are configured onto any of the two references retaining elements which comprise each of the additional platform layers and, at the same time, after the code configuration is completed, each lens is displaced randomly to the other positions of the two references retaining elements on the same plane, and if the positions of each of the lenses are not completely aligned in the vertical direction on each of the additional platforms, the input of the access code is not accepted, and conversely, for the case of successful data accessing, when the position of each lens is aligned in the vertical direction, by the prescribed alignment operation, the input of the access code is accepted.

15. A configuration method for an access code or for a security code as claimed in claim 14, wherein screen data used to perform the key lock cancellation operation is recorded in the external file.

16. A configuration method for an access code or for a security code as claimed in claim 6, wherein the prescribed data is related to the each of the additional platforms arranged in hierarchical layers above the base platform, and this configuration method makes the accessing of the data related to each of the additional platform layers possible.

17. A configuration method for an access code or for a security code as claimed in claim 5, wherein the digital element is assigned to each of the two references retaining elements in the additional platforms based on the digital elements assigned to each of the two references retaining elements along the x-axis direction and the y-axis direction in the base platform, and at the same time, the description order of the digital elements comprising the two references retaining element which are selected randomly is based on the priority order of the first areal code and second areal code in the base platform whose position completely overlaps that of the two references retaining element in the vertical direction, and the code configuration is performed with one or more additional platforms arranged above the base platform into hierarchical layers.

18. A configuration method for an access code or for a security code as claimed in claim 17, wherein each of the additional platforms arranged into hierarchical layers above the base platform is configured with a key lock, which requires the input of a disabling code in order to release it, and according to the prescribed cancellation operation, if the key lock is not cancelled, the code entry for the data accessing is not accepted.

19. A configuration method for an access code or for a security code as claimed in claim 18, wherein screen data used to perform the key lock cancellation operation is recorded in the external file.

20. A configuration method for an access code or for a security code as claimed in claim 17, wherein during the initial code configuration lenses are configured onto any of the two references retaining elements which comprise each of the additional platform layers and, at the same time, after the code configuration is completed, each lens is displaced randomly to the other positions of the two references retaining elements on the same plane, and if the positions of each of the lenses are not completely aligned in the vertical direction on each of the additional platforms, the input of the access code is not accepted, and conversely, for the case of successful data accessing, when the position of each lens is aligned in the vertical direction, by the prescribed alignment operation, the input of the access code is accepted.

21. A configuration method for an access code or for a security code as claimed in claim 20, wherein screen data used to perform the key lock cancellation operation is recorded in the external file.

22. A configuration method for an access code or for a security code as claimed in claim 17, wherein the prescribed data is related to the each of the additional platforms arranged in hierarchical layers above the base platform, and this configuration method makes the accessing of the data related to each of the additional platform layers possible.

23. A configuration method for an access code or for a security code as claimed in claim 5, wherein each of the additional platforms arranged into hierarchical layers above the base platform is configured with a key lock, which requires the input of a disabling code in order to release it, and according to the prescribed cancellation operation, if the key lock is not cancelled, the code entry for the data accessing is not accepted.

24. A configuration method for an access code or for a security code as claimed in claim 23, wherein screen data used to perform the key lock cancellation operation is recorded in the external file.

25. A configuration method for an access code or for a security code as claimed in claim 24, wherein during the initial code configuration lenses are configured onto any of the two references retaining elements which comprise each of the additional platform layers and, at the same time, after the code configuration is completed, each lens is displaced randomly to the other positions of the two references retaining elements on the same plane, and if the positions of each of the lenses are not completely aligned in the vertical direction on each of the additional platforms, the input of the access code is not accepted, and conversely, for the case of successful data accessing, when the position of each lens is aligned in the vertical direction, by the prescribed alignment operation, the input of the access code is accepted.

26. A configuration method for an access code or for a security code as claimed in claim 25, wherein screen data used to perform the key lock cancellation operation is recorded in the external file.

27. A configuration method for an access code or for a security code as claimed in claim 24, wherein the prescribed data is related to the each of the additional platforms arranged in hierarchical layers above the base platform, and this configuration method makes the accessing of the data related to each of the additional platform layers possible.

28. A configuration method for an access code or for a security code as claimed in claim 23, wherein each of the additional platforms arranged into hierarchical layers above the base platform is configured with a key lock, which requires the input of a disabling code in order to release it, and according to the prescribed cancellation operation, if the key lock is not cancelled, the code entry for the data accessing is not accepted.

29. A configuration method for an access code or for a security code as claimed in claim 28, wherein screen data used to perform the key lock cancellation operation is recorded in the external file.

30. A configuration method for an access code or for a security code as claimed in claim 23, wherein during the initial code configuration lenses are configured onto any of the two references retaining elements which comprise each of the additional platform layers and, at the same time, after the code configuration is completed, each lens is displaced randomly to the other positions of the two references retaining elements on the same plane, and if the positions of each of the lenses are not completely aligned in the vertical direction on each of the additional platforms, the input of the access code is not accepted, and conversely, for the case of successful data accessing, when the position of each lens is aligned in the vertical direction, by the prescribed alignment operation, the input of the access code is accepted.

31. A configuration method for an access code or for a security code as claimed in claim 30, wherein screen data used to perform the key lock cancellation operation is recorded in the external file.

32. A configuration method for an access code or for a security code as claimed in claim 23, wherein the prescribed data is related to the each of the additional platforms arranged in hierarchical layers above the base platform, and this configuration method makes the accessing of the data related to each of the additional platform layers possible.

33. A configuration method for an access code or for a security code as claimed in claim 5, wherein during the initial code configuration lenses are configured onto any of the two references retaining elements which comprise each of the additional platform layers and, at the same time, after the code configuration is completed, each lens is displaced randomly to the other positions of the two references retaining elements on the same plane, and if the positions of each of the lenses are not completely aligned in the vertical direction on each of the additional platforms, the input of the access code is not accepted, and conversely, for the case of successful data accessing, when the position of each lens is aligned in the vertical direction, by the prescribed alignment operation, the input of the access code is accepted.

34. A configuration method for an access code or for a security code as claimed in claim 33, wherein screen data used to perform the alignment operation used to line up the lenses are recorded in an external file.

35. A configuration method for an access code or for a security code as claimed in claim 34, wherein the prescribed data is related to the each of the additional platforms arranged in hierarchical layers above the base platform, and this configuration method makes the accessing of the data related to each of the additional platform layers possible.

36. A configuration method for an access code or for a security code as claimed in claim 33, wherein the prescribed data is related to the each of the additional platforms arranged in hierarchical layers above the base platform, and this configuration method makes the accessing of the data related to each of the additional platform layers possible.

37. A configuration method for an access code or for a security code as claimed in claim 5, wherein the prescribed data is related to the each of the additional platforms arranged in hierarchical layers above the base platform, and this configuration method makes the accessing of the data related to each of the additional platform layers possible.

38. A configuration method for an access code or for a security code as claimed in claim 5, wherein during the initial code configuration lenses are configured onto any of the two references retaining elements which comprise each of the additional platform layers and, at the same time, after the code configuration is completed, each lens is displaced randomly to the other positions of the two references retaining elements on the same plane, and if the positions of each of the lenses are not completely aligned in the vertical direction on each of the additional platforms, the input of the access code is not accepted, and conversely, for the case of successful data accessing, when the position of each lens is aligned in the vertical direction, by the prescribed alignment operation, the input of the access code is accepted.

* * * * *